US012591961B2

(12) United States Patent
Matsuura

(10) Patent No.: US 12,591,961 B2
(45) Date of Patent: Mar. 31, 2026

(54) MONITORING DEVICE AND MONITORING SYSTEM

(71) Applicant: SHIMADZU CORPORATION, Kyoto (JP)

(72) Inventor: Tohru Matsuura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 291 days.

(21) Appl. No.: 18/357,150

(22) Filed: Jul. 23, 2023

(65) Prior Publication Data

US 2024/0037725 A1 Feb. 1, 2024

(30) Foreign Application Priority Data

Jul. 26, 2022 (JP) .................................. 2022-118551

(51) Int. Cl.
G06T 7/70 (2017.01)
G06T 7/00 (2017.01)
H04N 7/18 (2006.01)

(52) U.S. Cl.
CPC .............. G06T 7/0004 (2013.01); G06T 7/70 (2017.01); *G06T 2207/20021* (2013.01); *G06T 2207/20076* (2013.01); *G06T 2207/20081* (2013.01); *G06T 2207/30108* (2013.01); *G06T 2207/30204* (2013.01); *H04N 7/183* (2013.01)

(58) Field of Classification Search
CPC ..................... G06T 7/0004; G06T 7/70; G06T 2207/20021; G06T 2207/20076; G06T 2207/20081; G06T 2207/30108; G06T 2207/30204; G06T 2207/20032; G06T 5/73; G06T 5/80; G06T 7/74; G06T 2207/10016; G06T 2207/30121; H04N 7/183; G06V 30/1465; G06V 20/52; G06V 20/62; G06V 30/16; G06V 30/1607; G06V 30/162; G06V 30/19007; G06V 2201/02; G06V 2201/06; G01N 3/068; G01N 3/32; G01N 2203/0005; G01N 2203/0073; G01N 2203/0647
USPC ......................................................... 382/103
See application file for complete search history.

(56) References Cited

U.S. PATENT DOCUMENTS

| | | | |
|---|---|---|---|
| 2015/0095717 A1 | 4/2015 | Frenz et al. | |
| 2015/0256713 A1* | 9/2015 | Booth ................ | H04N 1/40093 |
| | | | 358/466 |
| 2018/0225444 A1* | 8/2018 | Frenz ...................... | G06F 21/44 |

FOREIGN PATENT DOCUMENTS

JP          2016541036          12/2016

* cited by examiner

*Primary Examiner* — Stephen P Coleman
(74) *Attorney, Agent, or Firm* — JCIPRNET

(57) ABSTRACT

A monitoring device is a monitoring device of a material testing machine including a display having a marker on a display panel. The monitoring device includes: an acquisition unit that acquires a photographed image of a camera that photographs the display panel; a first generation unit that generates a first processed image obtained by gray-scaling the photographed image; a second generation unit that generates a second processed image obtained by performing blur processing on the first processed image; a third generation unit that generates a third processed image obtained by binarizing the first processed image based on the second processed image; and a first detection unit that detects the marker from the third processed image.

6 Claims, 16 Drawing Sheets

MK

Figure 5:
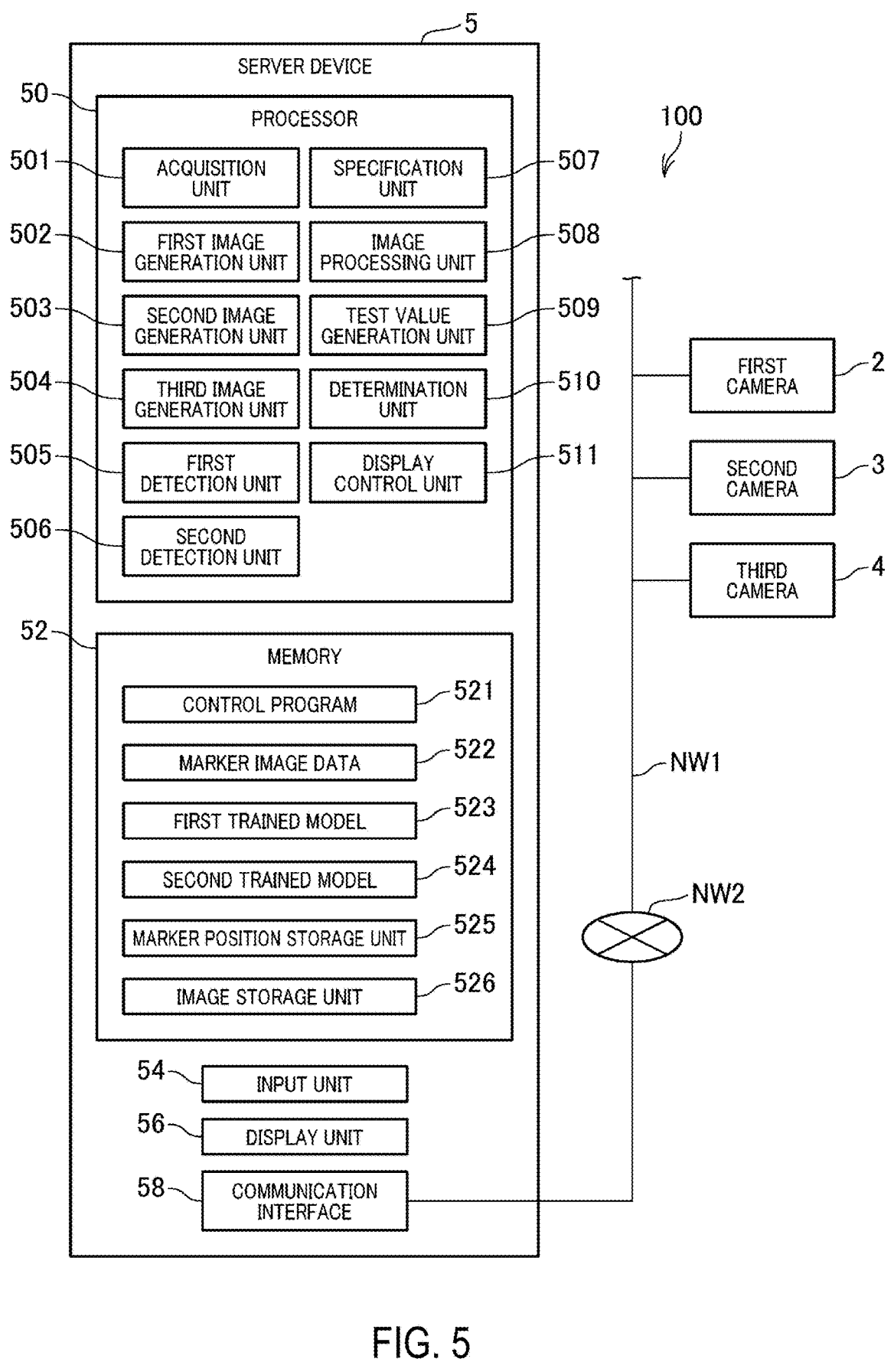

5

SERVER DEVICE

50 — PROCESSOR

501 — ACQUISITION UNIT

507 — SPECIFICATION UNIT

502 — FIRST IMAGE GENERATION UNIT

508 — IMAGE PROCESSING UNIT

503 — SECOND IMAGE GENERATION UNIT

509 — TEST VALUE GENERATION UNIT

504 — THIRD IMAGE GENERATION UNIT

510 — DETERMINATION UNIT

505 — FIRST DETECTION UNIT

511 — DISPLAY CONTROL UNIT

506 — SECOND DETECTION UNIT

52 — MEMORY

521 — CONTROL PROGRAM

522 — MARKER IMAGE DATA

523 — FIRST TRAINED MODEL

524 — SECOND TRAINED MODEL

525 — MARKER POSITION STORAGE UNIT

526 — IMAGE STORAGE UNIT

54 — INPUT UNIT

56 — DISPLAY UNIT

58 — COMMUNICATION INTERFACE

100

2 — FIRST CAMERA

3 — SECOND CAMERA

4 — THIRD CAMERA

MONITORING DEVICE AND MONITORING SYSTEM

INCORPORATION BY REFERENCE

The present application claims priority under 35 U.S.C. § 119 to Japanese Patent Application No. 2022-118551 filed on Jul. 26, 2022. The content of the application is incorporated herein by reference in its entirety.

BACKGROUND

Technical Field

The present invention relates to a monitoring device and a monitoring system.

Related Art

Conventionally, technology for managing an operation state of a material testing machine and test data by a computer has been proposed. For example, Japanese Unexamined Patent Publication No. 2016-541036 discloses a remote platform that acquires data regarding a status of a test device and test data by communicating with the test device.

SUMMARY

In the conventional technology, it is conceivable that a display included in the material testing machine is photographed by a camera, and a display panel of the display is remotely monitored by a photographed image of the camera. At the time of the monitoring, it is also conceivable to detect a marker of the display panel from the photographed image of the camera for a predetermined use. However, in a case where the marker of the display panel is a non-luminescent marker, if an exposure of the camera is set low, the marker appears dark in the photographed image of the camera, and there is a possibility that the marker cannot be detected from the photographed image of the camera. Here, it is conceivable to set the exposure of the camera high. However, if the exposure of the camera is increased, an influence of disturbance light may occur in the photographed image, so that the photographed image may be inappropriate as a photographed image used for monitoring the display panel.

The present invention has been made in view of such circumstances, and an object thereof is to enable a marker such as non-luminescent marker, luminescent marker, luminescent marker, phosphorescence maker or UI symbol marker on a display panel included in a display panel of a display to be detected from a photographed image of a camera even when an exposure of the camera is low.

A first aspect of the present invention relates to a monitoring device of a material testing machine including a display having a marker on a display panel. The monitoring device includes: an acquisition unit that acquires a photographed image of a camera that photographs the display panel; a first generation unit that generates a first processed image obtained by gray-scaling the photographed image; a second generation unit that generates a second processed image obtained by performing blur processing on the first processed image; a third generation unit that generates a third processed image obtained by binarizing the first processed image based on the second processed image; and a first detection unit that detects the marker from the third processed image.

A second aspect of the present invention relates to a monitoring system including a monitoring device of a material testing machine including a display having a marker on a display panel, and a camera that photographs the display panel. The monitoring device includes: an acquisition unit that acquires a photographed image of the camera that photographs the display panel; a first generation unit that generates a first processed image obtained by gray-scaling the photographed image; a second generation unit that generates a second processed image obtained by performing blur processing on the first processed image; a third generation unit that generates a third processed image obtained by binarizing the first processed image based on the second processed image; and a first detection unit that detects the marker from the third processed image.

According to the first aspect of the present invention, a marker can be highlighted in an image used for detection by the first detection unit. Therefore, even when an exposure of the camera is low, the marker of the display panel of the display can be detected from the photographed image of the camera.

According to the second aspect of the present invention, effects similar to those of the first aspect of the present invention are obtained.

BRIEF DESCRIPTION OF DRAWINGS

FIG. 5 is a diagram illustrating an example of a configuration of a server device;

DETAILED DESCRIPTION

1. First Embodiment

First, a first embodiment will be described.

[1-1. Configuration of Monitoring System]

Figure 1:
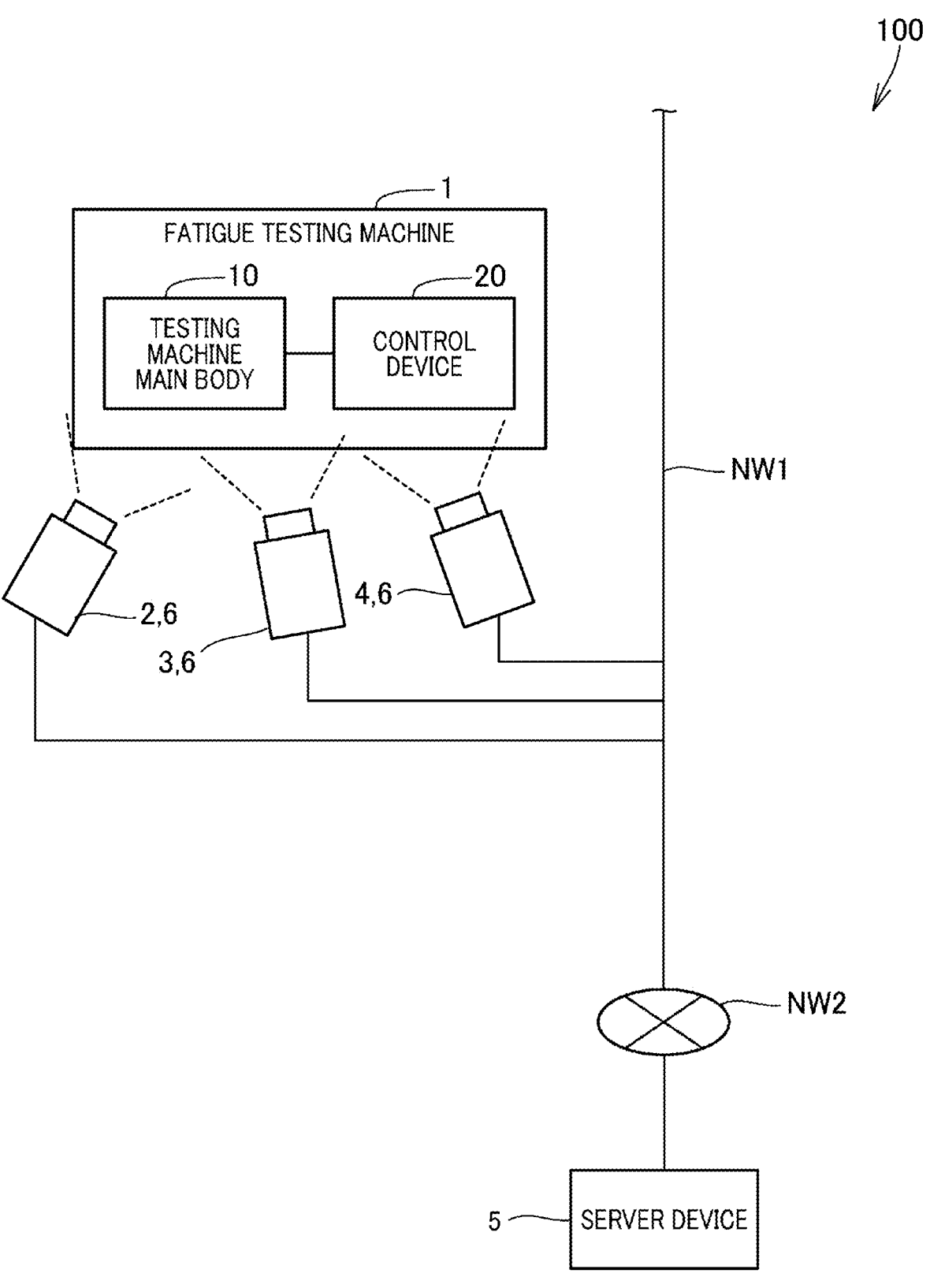
FIG. 1 is a diagram illustrating an example of a configuration of a monitoring system.

FIG. 1 is a diagram illustrating an example of a configuration of a monitoring system 100 according to the present embodiment.

The monitoring system 100 is a system in which a fatigue testing machine 1 is a monitoring target. FIG. 1 illustrates an example of a configuration in which the monitoring system 100 sets one fatigue testing machine 1 as a monitoring target. In the present embodiment, a case where the monitoring system 100 monitors one fatigue testing machine 1 will be described, but the number of fatigue testing machines 1 to be monitoring targets is not limited to one. The number of fatigue testing machines 1 to be the monitoring targets of the monitoring system 100 may be plural.

The fatigue testing machine 1 corresponds to an example of a "material testing machine".

The monitoring system 100 includes the fatigue testing machine 1.

The fatigue testing machine 1 includes a testing machine main body 10 and a control device 20. The fatigue testing machine 1 controls the testing machine main body 10 by the control device 20 to perform a fatigue test of a test piece SP. For example, the fatigue testing machine 1 repeatedly applies a tensile stress to the test piece SP. The tensile stress and the number of repetitions are set in advance. The number of repetitions is, for example, $10^2$ to $10^8$.

The control device 20 corresponds to an example of a "display".

The monitoring system 100 includes a first camera 2, a second camera 3, a third camera 4, and a server device 5. The third camera 4 corresponds to an example of a "camera".

The first camera 2 and the second camera 3 photograph the testing machine main body 10. The third camera 4 photographs the control device 20.

In the present embodiment, a case where the monitoring system 100 includes three cameras for one fatigue testing machine 1 to be a monitoring target will be described, but the present invention is not limited thereto. The monitoring system 100 may include one, two, or four or more cameras for one fatigue testing machine 1 to be the monitoring target.

In the following description, when the first camera 2, the second camera 3, and the third camera 4 are not distinguished, they are referred to as "cameras 6".

The camera 6 is a digital camera that photographs a predetermined photographing range. The camera 6 may be a digital still camera that photographs a still image or a digital video camera that photographs a moving image. The camera 6 has a communication function and performs data communication via a network NW1. In a case of photographing an image, the camera 6 transmits image data of the photographed image to the server device 5 via the network NW1.

In the present embodiment, a case where the camera 6 has a communication function will be described, but the present invention is not limited thereto. At least one of the cameras 6 may be configured not to have a communication function. In this case, at least one of the cameras 6 is connected to a computer not illustrated in the drawings. The computer has a communication function capable of executing data communication via the network NW1 and a function of controlling the camera 6 to be connected. The computer is, for example, a personal computer, a tablet computer, or a smartphone. In this case, the camera 6 connected to the computer performs photographing according to the control of the computer, and the computer transmits image data of a photographed image to the server device 5.

The network NW1 communicably connects the camera 6 and the server device 5 via a network NW2. The camera 6 is connected to the network NW1, and the network NW1 is connected to the network NW2 via a router or a gateway not illustrated in the drawings, or another communication network. The network NW1 is connected to the network NW2. The server device 5 is connected to the network NW2.

The server device 5 corresponds to an example of a "monitoring device".

The network NW1 is, for example, a local area network (LAN). The network NW1 includes, for example, an Ethernet (registered trademark) standard cable, a router and a gateway not illustrated in the drawings, and the like. Note that the network NW1 may be a wireless communication line such as Wi-Fi (registered trademark). The network NW2 communicably connects the camera 6 and the server device 5 via the network NW1. The network NW2 is, for example, a global network such as the Internet. Note that the network NW2 may be a wide area network (WAN).

The server device 5 is a server computer having a communication function. The server device 5 may include a plurality of server computers, and may be, for example, a cloud server. The server device 5 is a so-called application server. The server device 5 is disposed, for example, in a monitoring room. In the monitoring room, for example, a user monitors the fatigue testing machine 1 by monitoring a screen displayed on a display unit 56, in the server device 5.

[1-2. Configuration of Fatigue Testing Machine]

Figure 2:
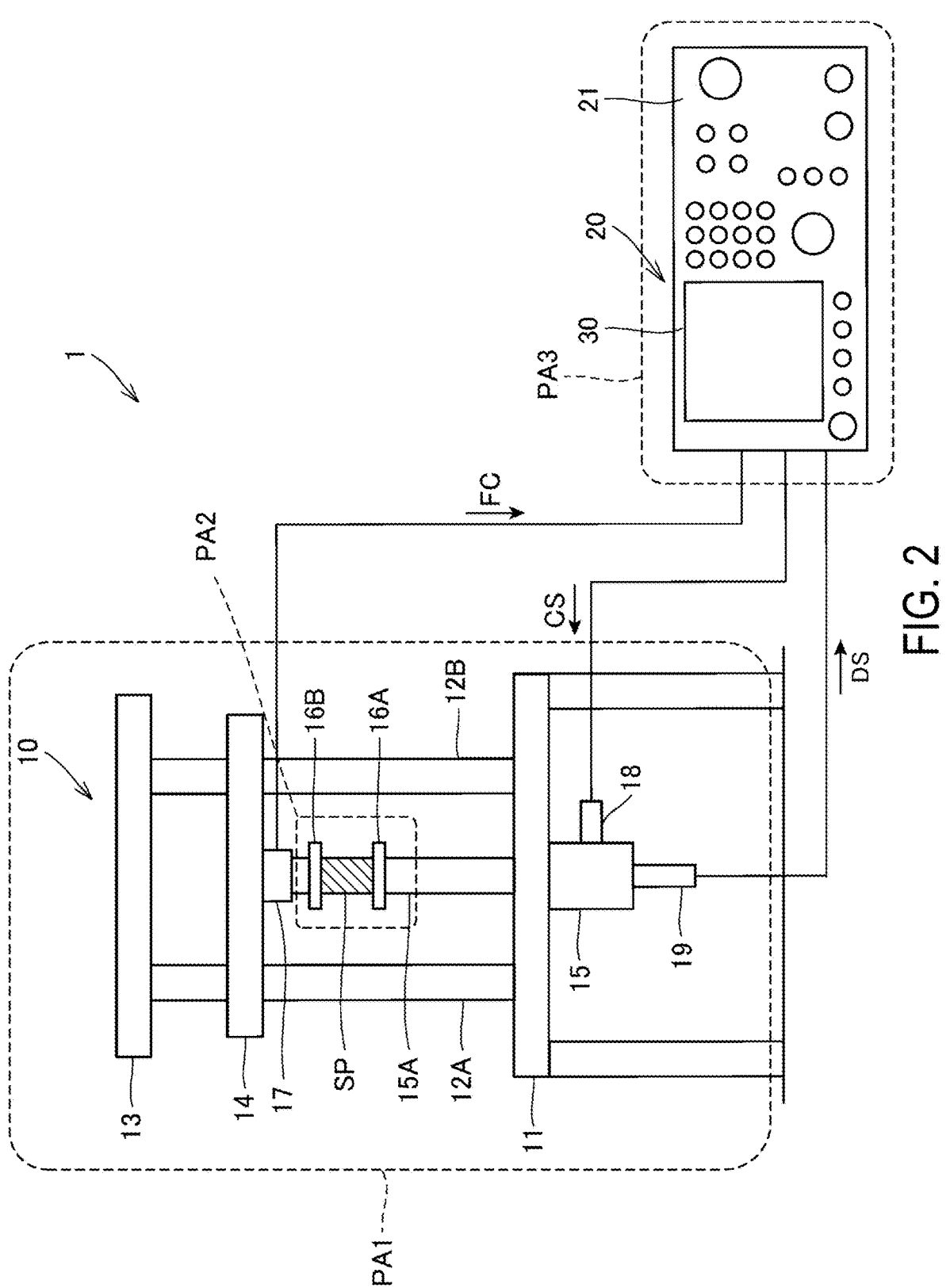
FIG. 2 is a diagram illustrating an example of a configuration of a fatigue testing machine.

FIG. 2 is a diagram illustrating an example of a configuration of the fatigue testing machine 1.

The testing machine main body 10 performs a fatigue test of the test piece SP according to an instruction from the control device 20. The control device 20 controls an operation of the testing machine main body 10.

As illustrated in FIG. 2, the testing machine main body 10 forms a load frame on a base 11 by a pair of supports 12A and 12B and a yoke 13, and a crosshead 14 is movably provided on the supports 12A and 12B.

A hydraulic actuator 15 is disposed on the base 11, and a lower jig 16A for fixing a lower end of the test piece SP is attached to a piston rod 15A of the hydraulic actuator 15. An upper jig 16B for fixing an upper end of the test piece SP is attached to the crosshead 14 with a load cell 17 therebetween. Each of the lower jig 16A and the upper jig 16B includes a chuck mechanism that grips the test piece SP.

The load cell 17 detects a test force acting on the test piece SP.

In the hydraulic actuator 15, a pressure oil direction and a pressure oil amount are controlled by a servo valve 18, and the piston rod 15A is expanded and contracted. As a result, the test force is applied to the test piece SP fixed between the upper jig 16B and the lower jig 16A. The stroke of the hydraulic actuator 15, that is, the displacement of the test piece SP is detected by a differential transformer 19 attached to the hydraulic actuator 15.

The testing machine main body 10 is provided with a power source and a hydraulic source not illustrated in the drawings. The power source supplies power to each part of the testing machine main body 10. The power source supplies power to, for example, various motors and drives the motors. The hydraulic source supplies a hydraulic pressure to a hydraulic device constituting the testing machine main body 10. For example, the hydraulic source supplies a hydraulic pressure to the hydraulic actuator 15 to drive the hydraulic actuator 15. That is, the hydraulic actuator 15 is driven by the hydraulic pressure supplied from the hydraulic source, and the piston rod 15A is expanded and contracted. The hydraulic source includes, for example, a hydraulic pump and a hydraulic control valve, and generates the hydraulic pressure by driving the hydraulic pump. The hydraulic control valve adjusts the hydraulic pressure output from the hydraulic source. Power is supplied from the power source to the hydraulic pump and the hydraulic control valve.

The control device 20 acquires a test force signal FS output from the load cell 17, performs A/D conversion on the test force signal FS, and generates test force information. The control device 20 acquires a displacement signal DS output from the differential transformer 19, performs A/D conversion on the displacement signal DS, and generates displacement information. The control device 20 generates command information based on the test force information and the displacement information. The control device 20 generates a command signal CS by performing D/A conversion on the command information, and outputs the generated command signal CS to the servo valve 18.

The servo valve 18 controls a pressure oil direction and a pressure oil amount with respect to the hydraulic actuator 15, according to the command signal CS output from the control device 20.

The control device 20 has a display 30. The display 30 includes a liquid crystal display (LCD) or the like. The control device 20 displays the test force information and the displacement information acquired from the testing machine main body 10 and the command information output to the testing machine main body 10 on the display 30.

In FIG. 2, an amplifier that amplifies each of the test force signal FS, the displacement signal DS, and the command signal CS may be disposed between the testing machine main body 10 and the control device 20.

The first camera 2 photographs a photographing range PA1 of the testing machine main body 10. The photographing range PA1 includes almost the entire testing machine main body 10.

The second camera 3 photographs a photographing range PA2 of the testing machine main body 10. The photographing range PA2 includes the test piece SP mounted on the testing machine main body 10. Specifically, the photographing range PA2 includes the upper jig 16B, the lower jig 16A, and the test piece SP.

The third camera 4 photographs a photographing range PA3 of the control device 20. The photographing range PA3 includes an entire display panel 21 provided with the display 30 in a housing of the control device 20.

In the following description, a photographed image obtained by photographing by the first camera 2 is referred to as a "testing machine main body photographed image", and is denoted by a reference sign "P1". In addition, a photographed image obtained by photographing by the second camera 3 is referred to as a "test piece photographed image", and is denoted by a reference sign "P2". In addition, a photographed image obtained by photographing by the third camera 4 is referred to as a "panel photographed image", and is denoted by a reference sign "P3".

[1-3. Configuration of Display Surface]

Figure 3:
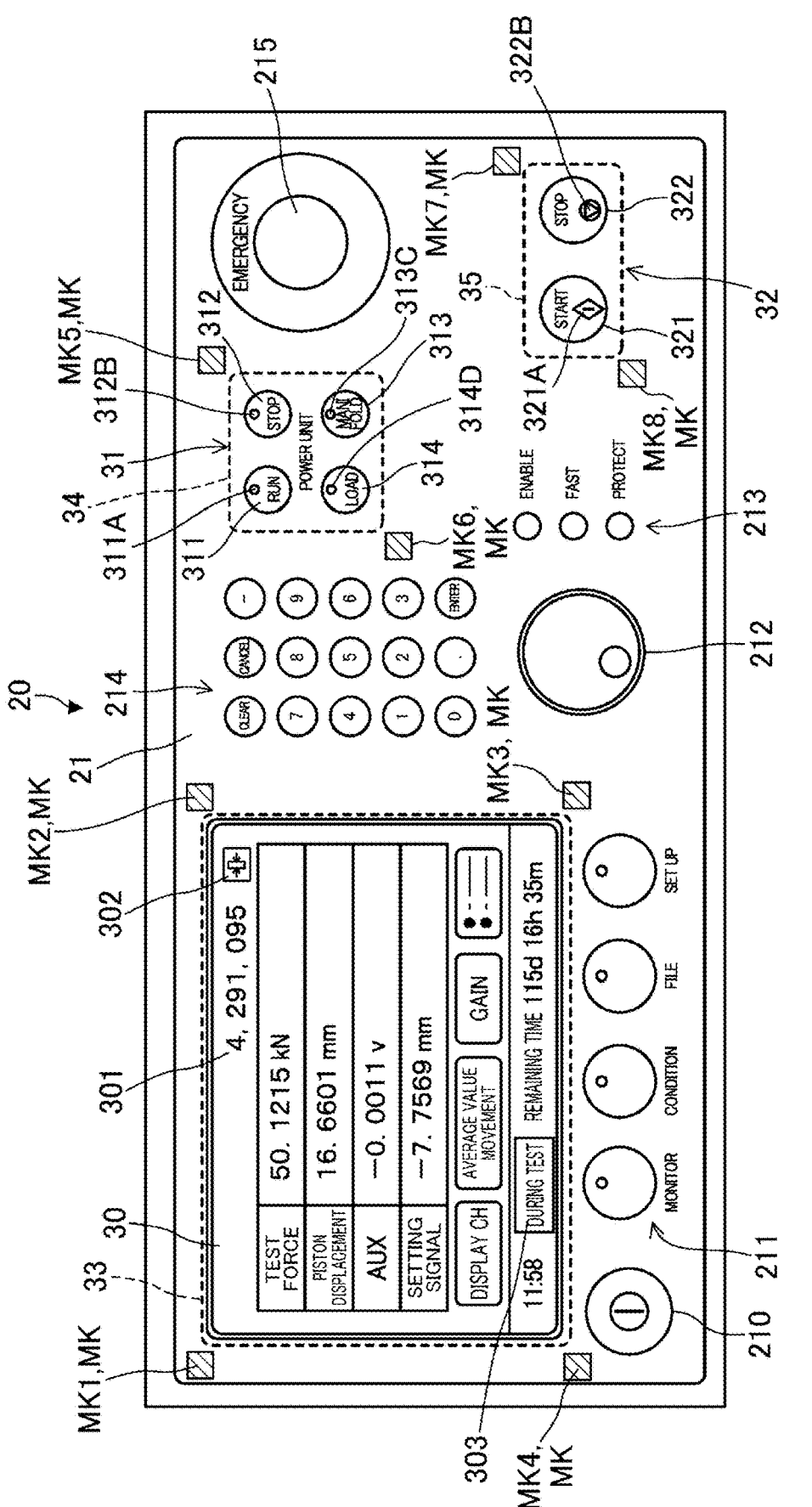
FIG. 3 is a diagram illustrating an example of a configuration of a display panel.

FIG. 3 is a diagram illustrating an example of a configuration of the display panel 21. The display panel 21 receives a user's operation on the control device 20 and displays various types of information indicating the operation or state of the fatigue testing machine 1.

As illustrated in FIG. 3, the display panel 21 includes a power switch 210, a function key 211, and a dial 212. The power switch 210 receives a power-on operation and a power-off operation of the control device 20. The function key 211 receives an operation of instructing the control device 20 to perform a specific function. The dial 212 receives an operation such as a change of a setting value.

The display panel 21 further includes a setting key 213, a numeric keypad 214, and an emergency stop switch 215. The setting key 213 receives an operation of setting the operation of the control device 20. The numeric keypad 214 receives an operation of inputting a numerical value. The emergency stop switch 215 receives an operation of emergently stopping the fatigue testing machine 1.

The display panel 21 further includes a display 30, a power unit operation key 31, and a test operation key 32. The power unit operation key 31 receives an operation on the hydraulic source of the fatigue testing machine 1. The test operation key 32 receives an operation of instructing the start and stop of a material test in the fatigue testing machine 1. The display 30 is configured as a touch panel including, for example, a display including an LCD or the like and a touch sensor disposed on a display surface of the display.

The display 30 displays various types of information such as a test force in a fatigue test executed by the fatigue testing machine 1, piston displacement, and a remaining time until the end of the fatigue test.

The display screen of the display 30 includes a cycle number display unit 301, a specific symbol display unit 302, and a test state display unit 303.

The cycle number display unit 301 displays the number of cycles in the fatigue test.

The specific symbol display unit 302 displays a predetermined specific symbol (for example, an icon).

The test state display unit 303 displays whether or not a fatigue test is executed in the fatigue testing machine 1. In the test state display unit 303, for example, characters "during test" or "during stop" are displayed to be superimposed on a predetermined background color.

The power unit operation key 31 has a start button 311, a stop button 312, a manifold button 313, and a pressure button 314. The start button 311 receives an operation of starting the hydraulic pump. The stop button 312 receives an operation of stopping the hydraulic pump.

The manifold button 313 receives an operation of opening and closing a pipe valve. The pipe valve is disposed on a hydraulic pipe between the hydraulic pump and the load valve. The pressure button 314 receives an operation of opening and closing the load valve. The load valve is disposed on a hydraulic pipe between the pipe valve and the servo valve 18.

The start button 311 has a display lamp 311A, the stop button 312 has a display lamp 312B, the manifold button 313 has a display lamp 313C, and the pressure button 314 has a display lamp 314D.

Each of the display lamp 311A, the display lamp 312B, the display lamp 313C, and the display lamp 314D includes a light emitting diode (LED) or the like. Each of the display lamp 311A, the display lamp 312B, the display lamp 313C, and the display lamp 314D may include a plurality of LEDs, and may be capable of selectively turning on two or more lighting colors.

When the hydraulic pump starts, the display lamp 311A is turned on, and when the hydraulic pump is stopped, the display lamp 311A is turned off.

When the hydraulic pump starts, the display lamp 312B is turned off, and when the hydraulic pump is stopped, the display lamp 312B is turned on.

When the pipe valve is opened, the display lamp 313C is turned on, and when the pipe valve is closed, the display lamp 313C is turned off.

When the load valve is opened, the display lamp 314D is turned on, and when the load valve is closed, the display lamp 314D is turned off.

The display lamp 311A, the display lamp 312B, the display lamp 313C, and the display lamp 314D display a hydraulic source state in the fatigue testing machine 1, that is, an operation state of the hydraulic source by a combination of lighting modes.

The test operation key 32 has a start key 321 and a stop key 322. The start key 321 has a display lamp 321A, and the stop key 322 has a display lamp 322B.

Each of the display lamp 321A and the display lamp 322B includes an LED or the like. Each of the display lamp 321A and the display lamp 322B may include a plurality of LEDs, and may be capable of selectively turning on two or more lighting colors.

When the fatigue testing machine 1 executes the fatigue test, the display lamp 321A is turned on, and when the fatigue testing machine 1 does not execute the fatigue test, the display lamp 321A is turned off.

When the fatigue testing machine 1 executes the fatigue test, the display lamp 322B is turned off, and when the fatigue testing machine 1 does not execute the fatigue test, the display lamp 322B is turned on.

The display lamp 321A and the display lamp 322B display a test state of the fatigue test in the fatigue testing machine 1, that is, whether the test is being performed or stopped by a combination of these lighting modes.

When the user presses the start key 321, the fatigue testing machine 1 starts the fatigue test, and characters "during test" are displayed in the test state display unit 303 of the display 30. In addition, when the user presses the stop key 322, the fatigue testing machine 1 stops the test operation during execution, and characters "during stop" are displayed in the test state display unit 303 of the display 30.

The display 30 is disposed in a rectangular first display area 33. The first display area 33 is an area in which the display 30 is disposed in the display panel 21.

The first display area 33 shows an example of a "predetermined area".

In FIG. 3, a marker MK is provided at each of four corners of the first display area 33. Specifically, a marker MK1 is disposed at the upper left corner of the first display area 33. A marker MK2 is disposed at the upper right corner of the first display area 33. A marker MK3 is disposed at the lower right corner of the first display area 33. A marker MK4 is disposed at the lower left corner of the first display area 33.

The power unit operation key 31 is disposed in a rectangular second display area 34. The second display area 34 is an area in which the power unit operation key 31 is disposed in the display panel 21.

The second display area 34 is an example of a "predetermined area".

In FIG. 3, markers MK are provided at two corners of the second display area 34. Specifically, a marker MK5 is disposed at the upper right corner of the second display area 34. In addition, a marker MK6 is disposed at the lower left corner of the second display area 34.

The test operation key 32 is disposed in a rectangular third display area 35. The third display area 35 is an area in which the test operation key 32 is disposed in the display panel 21.

The third display area 35 is an example of a "predetermined area".

In FIG. 3, markers MK are provided at two corners of a third display area 35. Specifically, a marker MK7 is disposed at the upper right corner of the third display area 35. In addition, a marker MK8 is disposed at the lower left corner of the third display area 35.

Each of the markers MK provided on the display panel 21 is a non-luminescent marker. That is, each of the markers MK does not self-emit light. The marker MK of the present embodiment has a rectangular shape, but a shape is not limited to the rectangular shape. Each of the markers MK is, for example, a label attached to the display panel 21 in advance. Note that each of the markers MK may be printed on the display panel 21 in advance.

Figure 4:
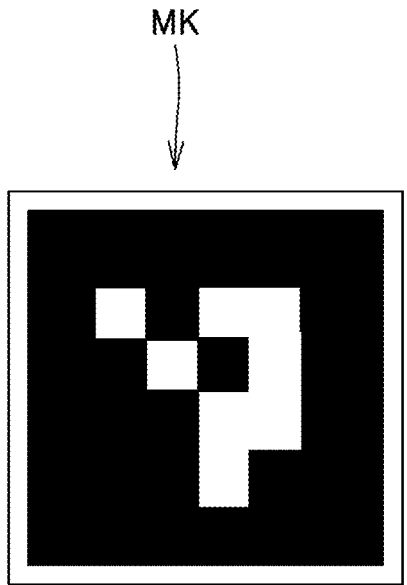
FIG. 4 is a diagram illustrating an example of a marker.

FIG. 4 is a diagram illustrating an example of the marker MK.

The marker MK has a white area and a black area. An outer edge portion of the marker MK includes a white area. A code is formed inside the outer edge portion of the marker MK. In the present embodiment, the code includes a white area and a black area. The code formed in the marker MK indicates an identification code of the display area (the first display area 33, the second display area 34, and the third display area 35) corresponding to the marker MK. Further, the code formed in the marker MK includes information indicating at which position in the corresponding display area the corresponding marker MK is disposed, for example, information such as "upper left", "upper right", "lower right", or "lower left" of the display area.

Each of the codes formed in the markers MK1, MK2, MK3, and MK4 includes an identification code of the first display area 33 and information indicating each position in the first display area 33. For example, the code formed in the marker MK1 includes an identification code of the first display area 33 and information indicating "upper left" in the first display area 33.

Each of the codes formed in the markers MK5 and MK6 includes an identification code of the second display area 34 and information indicating each position in the second display area 34.

Each of the codes formed in the markers MK7 and MK8 includes an identification code of the third display area 35 and information indicating each position in the third display area 35.

[1-4. Configuration of Server Device]

FIG. 5 is a diagram illustrating an example of a configuration of the server device 5.

The server device 5 is communicably connected to the first camera 2, the second camera 3, and the third camera 4 via the networks NW1 and NW2.

The server device 5 includes a processor 50, a memory 52, an input unit 54, a display unit 56, and a communication interface 58.

The processor 50 includes a central processing unit (CPU), a micro-processing unit (MPU), and the like. The memory 52 includes a read only memory (ROM), a random access memory (RAM), an HDD, an SSD, and the like. The memory 52 stores a control program 521, marker image data 522, a first trained model 523, and a second trained model 524.

The marker image data 522, the first trained model 523, and the second trained model 524 will be described later.

The input unit 54 includes various switches and keys used by the user. The input unit 54 may be connected to an input device used by the user, and may be configured to receive the user's input by detecting an operation on the input device. Examples of the input device include a pointing device such as a mouse or a track pad, and a keyboard.

The display unit 56 includes a display such as an LCD. The display unit 56 displays various screens including a first screen 800 and a second screen 900 described below, according to the control of the processor 50. The input unit 54 may include a touch sensor disposed to be superimposed on the display surface of the display unit 56.

The communication interface 58 is connected to the network NW2 and executes communication with the camera 6 via the network NW2 and the network NW1. The communication interface 58 includes, for example, a connector to which a communication cable can be connected and a communication circuit. The communication interface 58 may include a wireless communication interface and execute wireless communication.

The processor 50 executes the control program 521 stored in the memory 52, so that the server device 5 functions as an acquisition unit 501, a first image generation unit 502, a second image generation unit 503, a third image generation unit 504, a first detection unit 505, a second detection unit 506, a specification unit 507, an image processing unit 508, a test value generation unit 509, a determination unit 510, and a display control unit 511.

In addition, the processor 50 executes the control program 521 to cause the memory 52 to function as a marker position storage unit 525 and an image storage unit 526.

The first image generation unit 502 is an example of a "first generation unit". The second image generation unit 503 is an example of a "second generation unit". The third image generation unit 504 is an example of a "third generation unit".

The marker position storage unit 525 stores a position of the marker MK in a panel photographed image P3 as information for each marker MK. Specifically, the marker position storage unit 525 stores the coordinates of the marker MK in a coordinate system defined in the panel photographed image P3 as the position of the marker MK for each marker MK.

The image storage unit 526 stores a photographed image acquired by the acquisition unit 501. The photographed image stored in the image storage unit 526 includes a testing machine main body photographed image P1, a test piece photographed image P2, and a panel photographed image P3.

The acquisition unit 501 acquires a photographed image from the camera 6. Specifically, the acquisition unit 501 receives image data of the photographed image from the camera 6 via the communication interface 58. Note that the acquisition unit 501 may acquire the photographed image from the camera 6 each time the camera 6 generates the photographed image.

The first image generation unit 502 generates a grayscale image P4.

Figure 6:
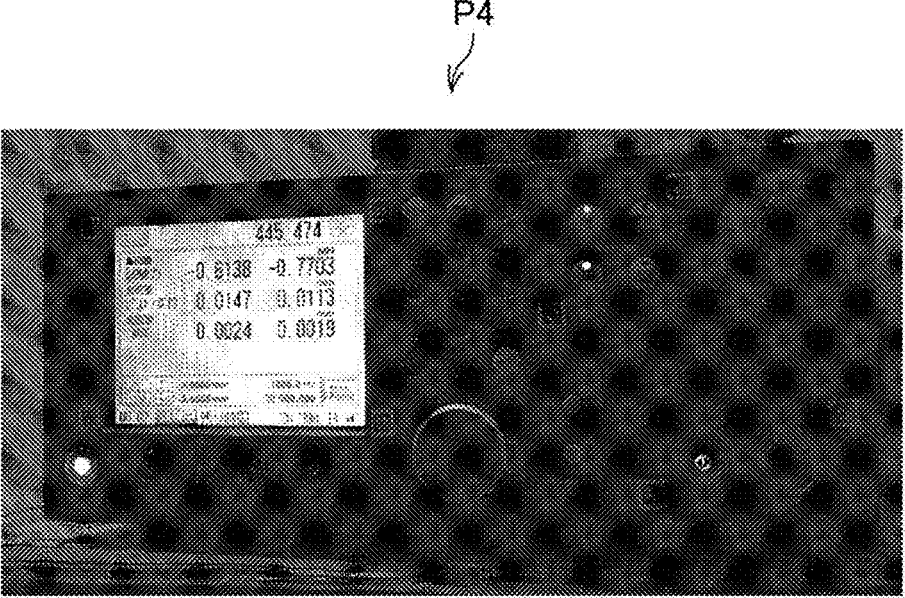
FIG. 6 is a diagram illustrating an example of a grayscale image.

FIG. 6 is a diagram illustrating an example of the grayscale image P4.

The grayscale image P4 is an image obtained by grayscaling the panel photographed image P3 acquired by the acquisition unit 501. In the present embodiment, the display panel 21 appearing in the panel photographed image P3 is distorted in a trapezoidal shape. This is because a normal direction of the display panel 21 is inclined with respect to an optical axis of the third camera 4. Therefore, as illustrated in FIG. 6, the display panel 21 appearing in the grayscale image P4 is distorted in a trapezoidal shape.

The grayscale image P4 is an example of a "first processed image".

The second image generation unit 503 generates a blur-processed image P5.

Figure 7:
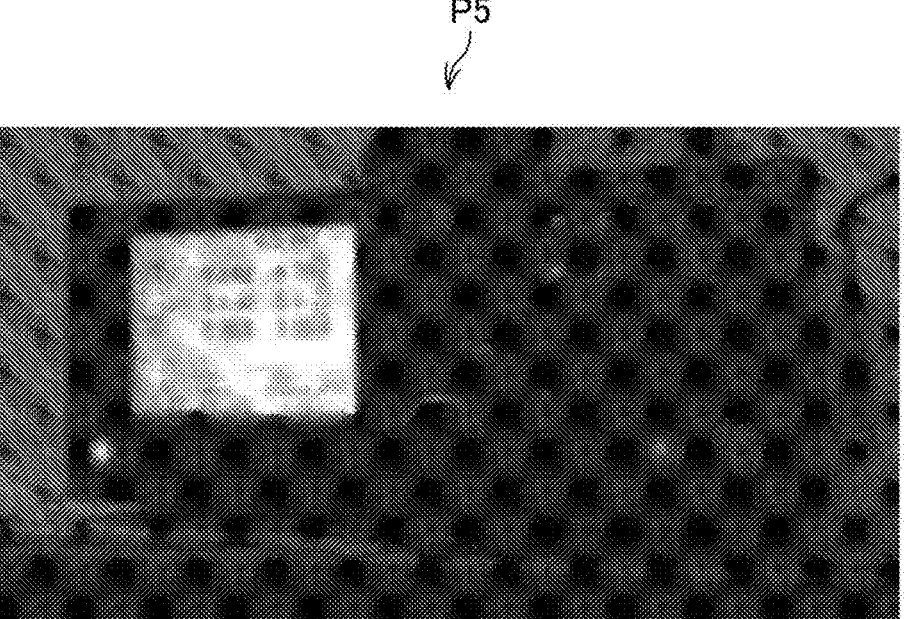
FIG. 7 is a diagram illustrating an example of a blur-processed image.

FIG. 7 is a diagram illustrating an example of the blur-processed image P5.

The blur-processed image P5 is an image obtained by performing blur processing on the grayscale image P4 generated by the first image generation unit 502. The blur processing is processing for blurring an image. The blur processing includes gradation processing for leveling pixels of an image and filter processing by a median filter. The second image generation unit 503 of the present embodiment performs the blur processing on the grayscale image P4 by a Gaussian filter, and generates a blur-processed image P5 in which each pixel of the grayscale image P4 is smoothed.

The second image generation unit 503 changes a value of a filter parameter of the blur processing used for generating the blur-processed image P5. In the present embodiment, a filter size is exemplified as the filter parameter. A change of a value of the filter size will be described later.

The third image generation unit 504 generates a binarized image P6.

Figure 8:
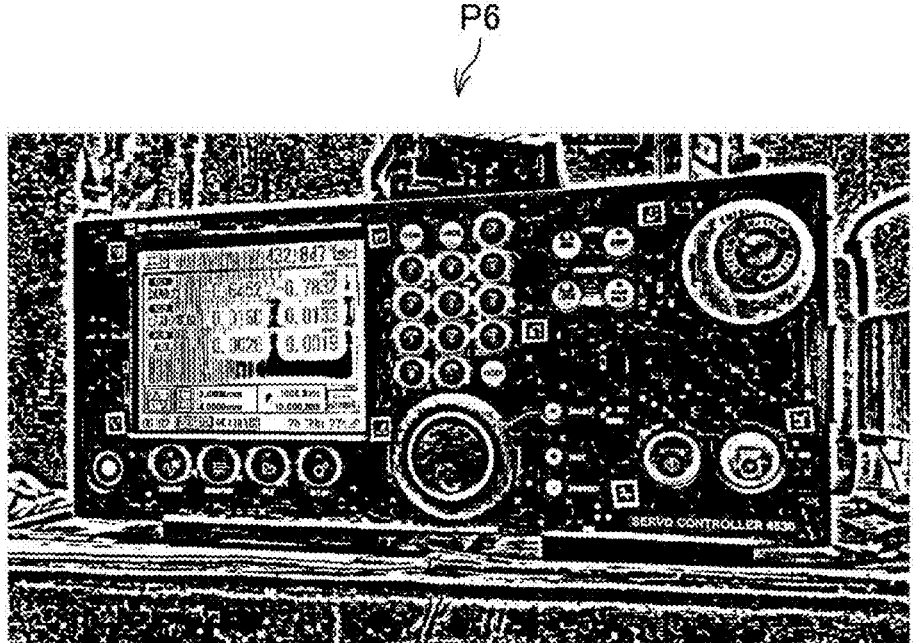
FIG. 8 is a diagram illustrating an example of a binarized image.

FIG. 8 is a diagram illustrating an example of the binarized image P6.

The binarized image P6 is an image obtained by binarizing the grayscale image P4 generated by the first image generation unit 502 based on the blur-processed image P5 generated by the second image generation unit 503. The third image generation unit 504 generates the binarized image P6 with the pixel of the grayscale image P4 having luminance lower than that of the pixel of the blur-processed image P5 as black and the pixel of the grayscale image P4 having luminance higher than that of the blur-processed image P5 as white, in pixels having the same coordinates.

The binarized image P6 corresponds to an example of a "third processed image".

The first detection unit 505 detects the marker MK from the binarized image P6. The first detection unit 505 reads the marker image data 522 from the memory 52. The marker image data 522 stores image data of the marker MK for each of the markers MK included in the display panel 21. The marker image data 522 stores image data of the same number of markers MK as the number of markers MK included in the display panel 21. The first detection unit 505 detects the marker MK from the binarized image P6 by pattern matching using the image of the marker MK indicated by the marker image data 522. Specifically, the first detection unit 505 determines whether or not there is an image in which a degree of coincidence with the image indicated by the marker image data 522 is a predetermined value (for example, 90%) or more in the binarized image P6. In addition, the first detection unit 505 detects, as the marker MK, an image in which the degree of coincidence with the image indicated by the marker image data 522 is the predetermined value or more.

The second detection unit 506 detects the position of the marker MK detected by the first detection unit 505 in the panel photographed image P3. The second detection unit 506 detects the position of the marker MK detected by the first detection unit 505 in the binarized image P6 as the position of the marker MK in the panel photographed image P3. The second detection unit 506 detects the coordinates in the coordinate system defined in the binarized image P6 as the position of the marker MK. When the position of the marker MK is detected, the second detection unit 506 stores information indicating the detected position of the marker MK in the marker position storage unit 525.

Figure 9:
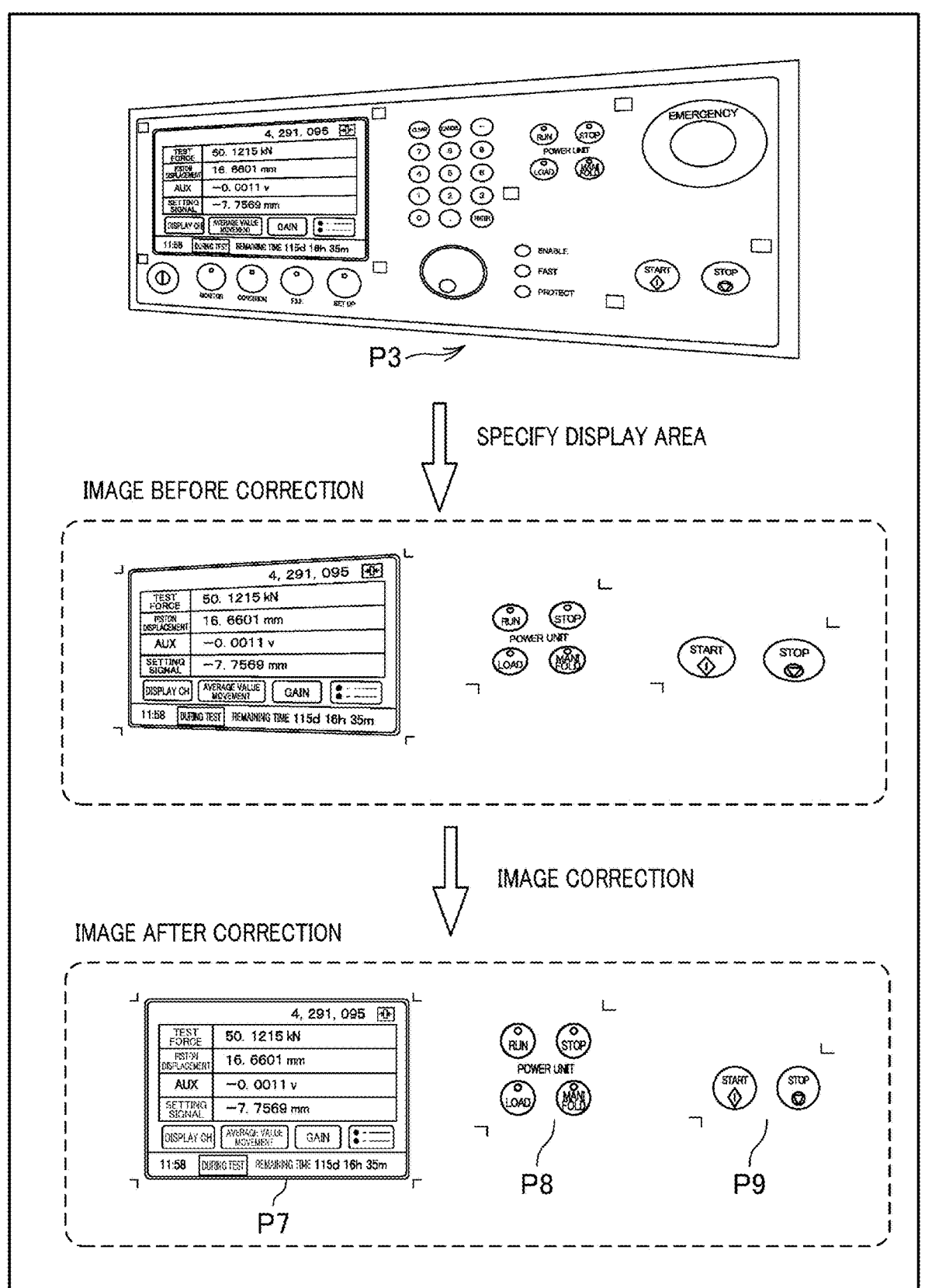
FIG. 9 is a diagram illustrating an example of processing of a specification unit and an image processing unit.

The specification unit 507 and the image processing unit 508 will be described with reference to FIG. 9. FIG. 9 is a diagram illustrating an example of processing of the specification unit 507 and the image processing unit 508.

The specification unit 507 specifies areas corresponding to the first display area 33, the second display area 34, and the third display area 35 from the panel photographed image P3 acquired by the acquisition unit 501. The specification unit 507 specifies the marker MK in the panel photographed image P3 using the position of the marker MK stored in the marker position storage unit 525. Specifically, the specification unit 507 specifies the marker MK on the assumption that the marker MK is at the position of the marker MK stored in the marker position storage unit 525 in the panel photographed image P3. Next, the specification unit 507 reads a code formed on the specified marker MK, specifies a position at which the marker MK is a marker MK, and specifies areas corresponding to the first display area 33, the second display area 34, and the third display area 35.

As illustrated in a middle left diagram of FIG. 9, when the positions of the markers MK1, MK2, MK3, and MK4 are specified in the panel photographed image P3, the specification unit 507 specifies a quadrangular area having four corners at the positions of the specified markers MK1, MK2, MK3, and MK4 as an area corresponding to the first display area 33 in the panel photographed image P3. In addition, as illustrated in a middle center diagram of FIG. 9, when the positions of the markers MK5 and MK6 are specified in the panel photographed image P3, the specification unit 507 specifies a rectangular area in which the positions of the specified markers MK5 and MK6 are diagonal as an area corresponding to the second display area 34 in the panel photographed image P3. In addition, as illustrated in a middle right diagram of FIG. 9, when the positions of the markers MK7 and MK8 are specified in the panel photographed image P3, the specification unit 507 specifies a rectangular area in which the specified positions of the markers MK7 and MK8 are diagonal as an area corresponding to the third display area 35 in the panel photographed image P3.

The image processing unit 508 extracts an image of an area corresponding to the first display area 33 specified by the specification unit 507 (the middle left diagram in FIG. 9) from the panel photographed image P3, and calculates a correction function for correcting distortion of the image based on the extracted image. In the present embodiment, the correction function is defined by a projective transformation matrix for correcting the image of the area corresponding to the first display area 33 specified by the specification unit 507 to a rectangular image. The image processing unit 508 generates a display image P7, a first lamp image P8, and a second lamp image P9 converted into rectangular images using the calculated projective transformation matrix.

The display image P7 is an image after the image of the area corresponding to the first display area 33 is corrected to a rectangular image. The first lamp image P8 is an image obtained by correcting the image of the area corresponding to the second display area 34 to a rectangular image. The second lamp image P9 is an image obtained by correcting the image of the area corresponding to the third display area 35 to a rectangular image.

Returning to the description of the configuration of the server device 5, the test value generation unit 509 generates a test value that is included in the display image P7 and is displayed on the display panel 21.

For example, the test value generation unit 509 estimates a character size indicating the number of cycles based on the size of the specific symbol displayed on the specific symbol display unit 302 included in the display image P7. Then, the test value generation unit 509 generates a value of the number of cycles by image recognition processing (here, character recognition processing) using the estimated character size. Here, a case where the test value generation unit 509 generates a value of the number of cycles will be described, but the test value generation unit 509 also generates values such as a test force and a displacement as test values by processing similar to that in the value of the number of cycles.

In addition, the test value generation unit 509 generates the value of the number of cycles by the character recognition processing and outputs the accuracy of the value of the number of cycles in the character recognition processing. The accuracy of the value of the number of cycles is a value representing the probability of the value of the number of cycles in percentage.

The determination unit 510 determines a hydraulic source state based on the first lamp image P8. In addition, the determination unit 510 determines a test state of the fatigue test based on the second lamp image P9.

First, determination processing of the hydraulic source state will be described.

The determination unit 510 determines the hydraulic source state based on a combination of lighting modes of the display lamp 311A, the display lamp 312B, the display lamp 313C, and the display lamp 314D. In the present embodiment, the "lighting mode" indicates whether to turn on or turn off the display lamp.

When the display lamp 311A is turned on and the display lamps 312B, 313C, and 314D are turned off, the determination unit 510 determines that the hydraulic source state is a "RUN state", that is, the hydraulic pump is in a started state.

When the display lamp 312B is turned on and the display lamps 311A, 313C, and 314D are turned off, the determination unit 510 determines that the hydraulic source state is a "STOP state", that is, the hydraulic pump is in a stopped state.

When the display lamps 311A, 313C, and 314D are turned on and the display lamp 312B is turned off, the determination unit 510 determines that the hydraulic source state is a "LOAD_MANI state", that is, the pipe valve and the load valve are in an opened state.

When the display lamps 312B and 313C are turned on and the display lamps 311A and 314D are turned off, the determination unit 510 determines that the hydraulic source state is a "STOP MANI state", that is, the pipe valve is in an opened state.

When the display lamps 311A and 314D are turned on and the display lamps 312B and 313C are turned off, the determination unit 510 determines that the hydraulic source state is a "LOAD state", that is, the load valve is in an opened state.

When all the display lamps 311A, 312B, 313C, and 314D are turned off, the determination unit 510 determines that the hydraulic source state is a "POWER OFF state", that is, power supplies for the operations of the hydraulic pump, the pipe valve, and the load valve are in an OFF state.

In addition, the determination unit 510 determines the hydraulic source state using the first trained model 523. Specifically, the determination unit 510 determines the hydraulic source state by inputting the first lamp image P8 to the first trained model 523. The first trained model 523 is a trained model in which a relation between the first lamp image P8 obtained by photographing a combination of various lighting modes of the display lamps 311A to 314D and the hydraulic source state corresponding to a combination of lighting modes of the display lamps 311A to 314D is trained by pattern recognition algorithms, such as template matching or machine learning-based approaches (so-called "supervised learning"). The determination unit 510 determines the hydraulic source state by inputting the first lamp image P8 to the first trained model 523.

Next, determination processing of the test state of the fatigue test will be described.

The determination unit 510 determines the test state of the fatigue test based on the combination of the lighting modes of the plurality of display lamps. Specifically, the determination unit 510 determines the test state of the fatigue test based on the combination of the lighting modes of the display lamp 321A and the display lamp 322B.

When the display lamp 321A is turned on and the display lamp 322B is turned off, the determination unit 510 determines that the test state of the fatigue test is a "START state", that is, the fatigue test is in an executed state.

When the display lamp 322B is turned on and the display lamp 321A is turned off, the determination unit 510 determines that the test state of the fatigue test is a "STOP state", that is, the fatigue test is in a stopped state.

In addition, the determination unit 510 determines the test state of the fatigue test using the second trained model 524. Specifically, the determination unit 510 determines the test state of the fatigue test by inputting the second lamp image P9 to the second trained model 524. The second trained model 524 is a trained model in which a relation between the second lamp image P9 obtained by photographing the combination of various lighting modes of the display lamps 321A and 322B and the test state of the fatigue test corresponding to the combination of the lighting modes of the display lamps 321A and 322B is trained by machine learning (so-called "supervised learning"). The determination unit 510 determines the test state of the fatigue test by inputting the second lamp image P9 to the second trained model 524.

The output of the first trained model 523 includes the accuracy of the determination on the hydraulic source state. In addition, the output of the second trained model 524 includes the accuracy of determination on the test state of the fatigue test. The accuracy of the determination is a value representing the probability of the determination in percentage.

In other words, the determination unit 510 determines the hydraulic source state and outputs the accuracy of the determination. In addition, the determination unit 510 determines the test state of the fatigue test and outputs the accuracy of the determination.

The display control unit 511 generates the first screen 800 and causes the display unit 56 to display the generated first screen 800. In addition, the display control unit 511 generates the second screen 900 and causes the display unit 56 to display the generated second screen 900.

Figure 10:
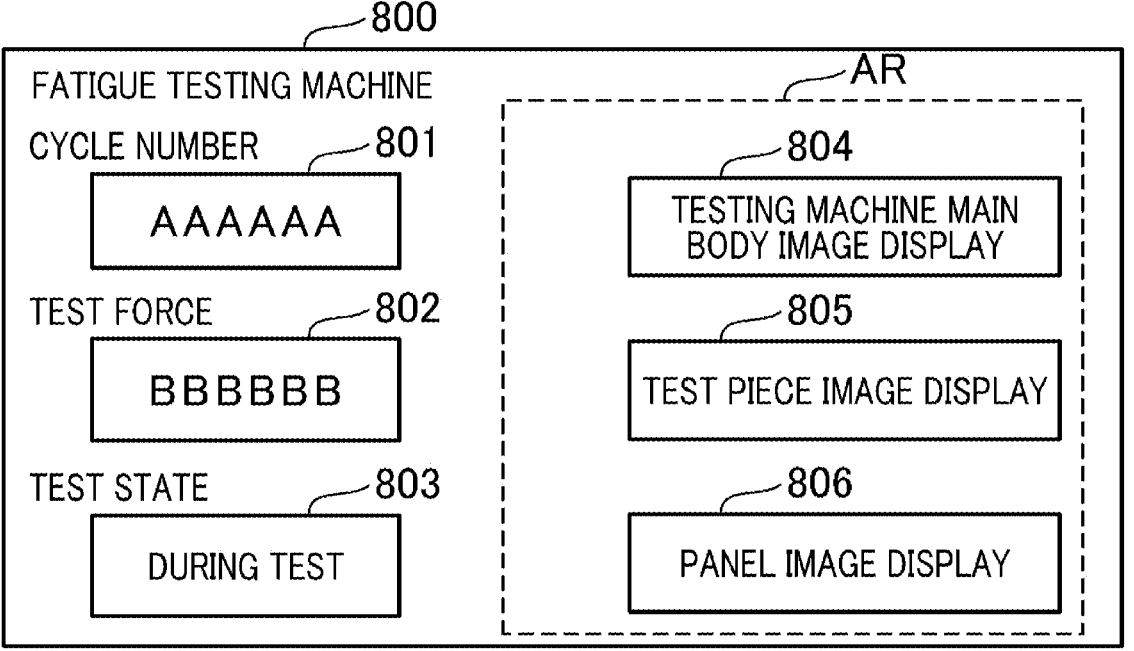
FIG. 10 is a diagram illustrating an example of a first screen.

FIG. 10 is a diagram illustrating an example of the first screen 800.

The first screen 800 includes a cycle number display unit 801, a test force display unit 802, a test state display unit 803, a main body image display button 804, a test piece image display button 805, and a panel image display button 806.

The cycle number display unit 801 displays a value of the number of cycles of the fatigue testing machine 1. The value of the number of cycles is generated by the test value generation unit 509.

The test force display unit 802 displays a value of the test force of the fatigue testing machine 1. The value of the test force is generated by the test value generation unit 509.

The test state display unit 803 displays a test state of the fatigue testing machine 1. The test state of the fatigue testing machine 1 is determined by the determination unit 510 based on the second lamp image P10.

The main body image display button 804 is clicked by the user when the testing machine main body photographed image P1 of the fatigue testing machine 1 is displayed. When the main body image display button 804 is clicked, the display control unit 511 reads the testing machine main body photographed image P1 from the image storage unit 526, and displays the read testing machine main body photographed image P1 in the display area AR.

The test piece image display button 805 is clicked by the user when the test piece photographed image P2 is displayed. When the test piece image display button 805 is clicked, the display control unit 511 reads the test piece photographed image P2 from the image storage unit 526 and displays the read test piece photographed image P2 in the display area AR.

The panel image display button 806 is clicked by the user when the panel photographed image P3 is displayed. When the panel image display button 806 is clicked, the display control unit 511 reads the panel photographed image P3 from the image storage unit 526 and displays the read panel photographed image P3 in the display area AR.

Figure 11:
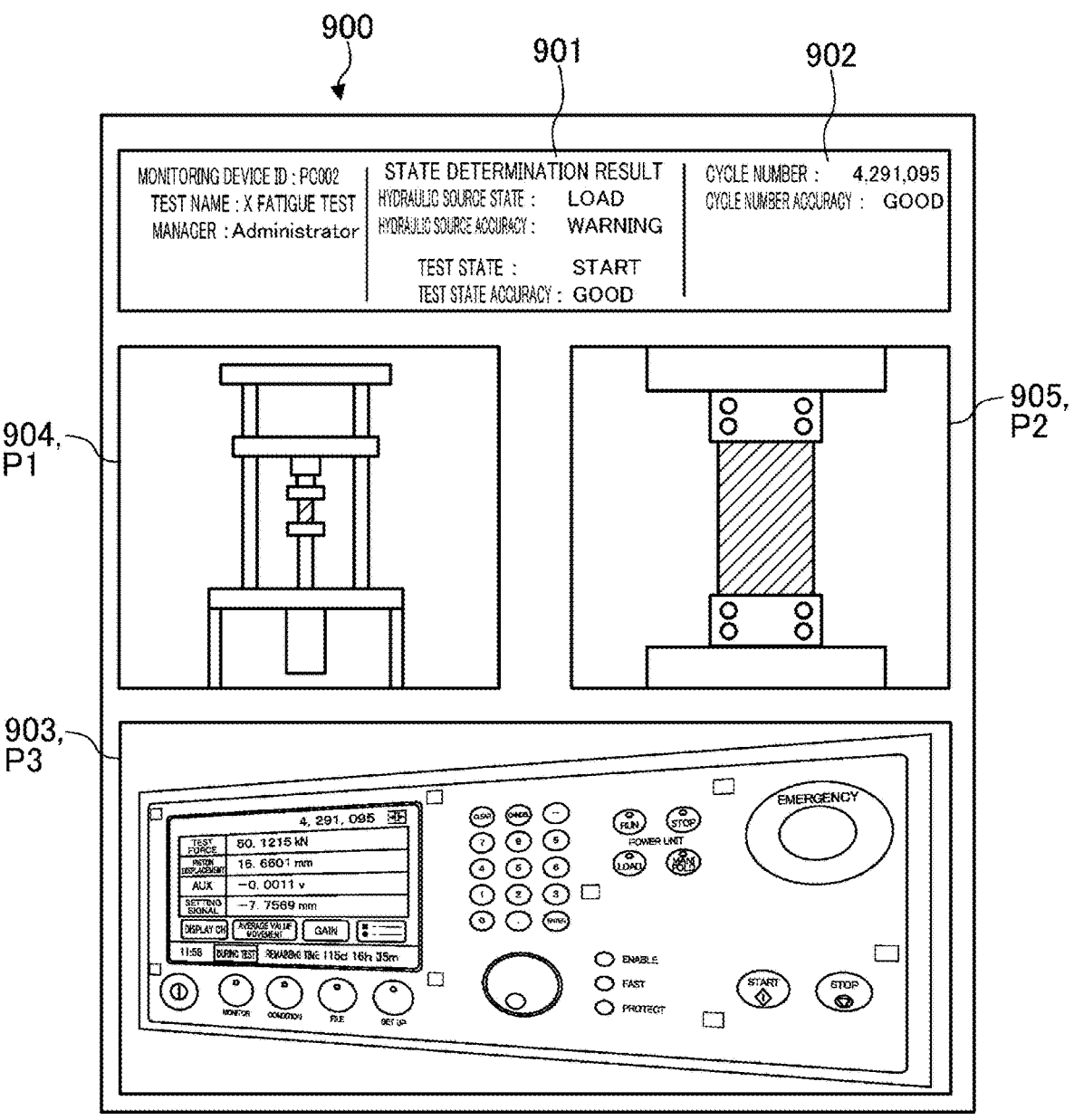
FIG. 11 is a diagram illustrating an example of a second screen.

FIG. 11 is a diagram illustrating an example of the second screen 900.

The second screen 900 includes a determination result display unit 901, a numerical value display unit 902, a panel image display unit 903, a main body image display unit 904, and a test piece image display unit 905.

The determination result display unit 901 displays a determination result of the determination unit 510, that is, the hydraulic source state and the test state of the fatigue test.

For example, the determination result display unit 901 displays that the hydraulic source state is a "LOAD state". In addition, the determination result display unit 901 displays, for example, "WARNING" indicating that the accuracy of the determination of the hydraulic source state is less than a first threshold. The first threshold is, for example, 80%.

In addition, the determination result display unit 901 displays, for example, that the test state of the fatigue test is a "START state". In addition, the determination result display unit 901 displays, for example, "GOOD" indicating that the accuracy of the determination of the test state of the fatigue test is a second threshold or more. The second threshold is, for example, 80%.

The numerical value display unit 902 displays a test value generated by the test value generation unit 509. The numerical value display unit 902 displays, for example, a value of the number of cycles. In addition, the numerical value display unit 902 displays, for example, "GOOD" indicating that the accuracy of the value of the number of cycles is a third threshold or more. The third threshold is, for example, 80%.

The panel image display unit 903 displays the panel photographed image P3. The main body image display unit 904 displays the testing machine main body photographed image P1. The test piece image display unit 905 displays the test piece photographed image P2.

[1-5. Operation of Server Device]

Next, an operation of the server device 5 will be described.

First, an operation related to storage of the position of the marker MK will be described.

Figure 12:
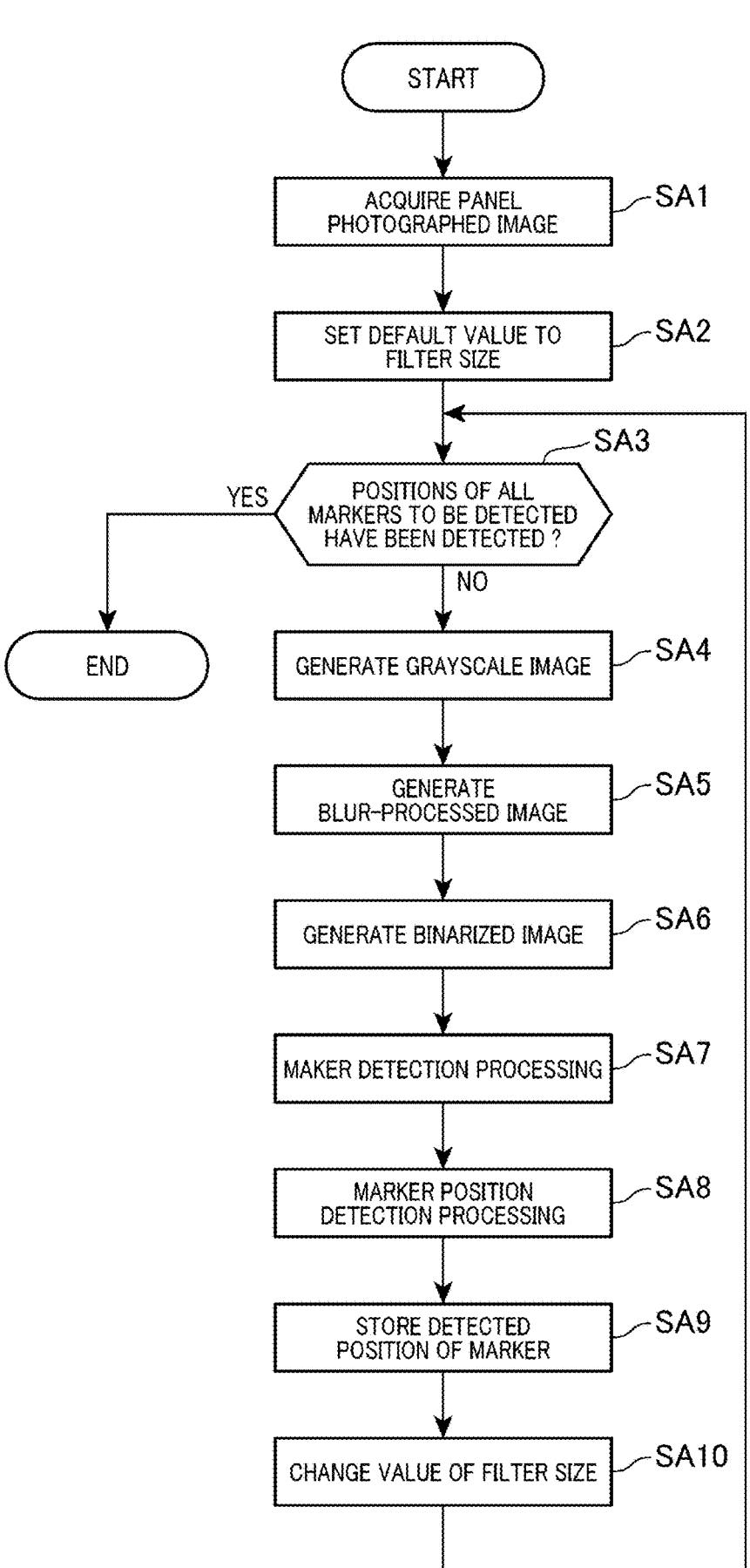
FIG. 12 is a flowchart illustrating an operation of the server device.

FIG. 12 is a flowchart illustrating an operation of the server device 5.

In a case where a predetermined start trigger is generated, the server device 5 performs the operation of FIG. 12. Here, examples of the predetermined start trigger include a case where an instruction to update the position of the marker MK in the panel photographed image P3 is received from the user, a case where an instruction to newly set the position of the marker MK in the panel photographed image P3 is received from the user, and the like.

The acquisition unit 501 acquires the panel photographed image P3 (step SA1).

Next, the second image generation unit 503 sets a default value to a filter size of the blur processing (step SA2).

Next, the second detection unit 506 determines whether or not positions of all markers MK to be detected have been detected (step SA3). The second detection unit 506 makes an affirmative determination in step SA3 when the positions of the different markers MK can be detected for the number of pieces of image data stored in the marker image data 522 stored in the memory 52, and makes a negative determination in step SA3 otherwise.

When the second detection unit 506 determines that the positions of all the markers MK to be detected have not been detected (step SA3: NO), the first image generation unit 502 generates the grayscale image P4 obtained by gray-scaling the panel photographed image P3 acquired in step SA1 (step SA4).

Next, the second image generation unit 503 generates the blur-processed image P5 obtained by performing the blur processing on the grayscale image P4 generated in step SA3 (step SA5). Note that, in a case where the processing of step SA5 is the first processing after starting the flowchart of FIG. 12, the blur processing in which the default value has been set to the filter size is applied to the panel photographed image P3. In addition, in a case where the processing of step SA5 is the second and subsequent processing after starting the flowchart of FIG. 12, the blur processing in which the value changed in step SA10 has been set to the filter size is applied to the panel photographed image P3.

Next, the third image generation unit 504 generates the binarized image P6 using the grayscale image P4 generated in step SA4 and the blur-processed image P5 generated in step SA5 (step SA6).

Next, the first detection unit 505 performs marker detection processing (step SA7). The marker detection processing is processing of detecting the marker MK from the binarized image P6 generated in step SA6.

Next, the second detection unit 506 performs marker position detection processing (step SA8). The marker position detection processing is processing of detecting the position of the marker MK detected in the marker detection processing of step SA7 in the panel photographed image P3. In a case where the marker MK is not detected in the marker detection processing, the processor 50 skips the processing of step SA8.

Next, the second detection unit 506 stores the position of the marker MK detected in the marker position detection processing in the marker position storage unit 525 (step SA9).

Next, the second image generation unit 503 changes the value of the filter size (step SA10).

In step SA10, the second image generation unit 503 may change the value of the filter size within a range of a lower limit value and an upper limit value determined from the size of the marker MK. The second image generation unit 503 determines the lower limit value and the upper limit value by the size of the marker MK. For example, the second image generation unit 503 sets 1.5 times the maximum size of the marker MK estimated in the panel photographed image P3 as the upper limit value of the filter size, and sets 0.5 times the minimum size of the marker MK estimated in the panel photographed image P3 as the lower limit value of the filter size. The maximum size and the minimum size of the marker MK to be estimated are stored in advance in the memory 52 as data. Note that, in the present embodiment, a minimum unit of the filter size corresponds to one pixel.

In step SA10, the second image generation unit 503 may increase or decrease the value of the filter size by one or more stages from the currently set value of the filter size. For example, when the currently set filter size is 10×10, the second image generation unit 503 may change the filter size to 11×11. Note that the stage of increasing the filter size is not limited to one stage, and may be a plurality of stages. In this stepwise change, the second image generation unit 503 may change the filter size within the range of the upper limit value and the lower limit value of the filter size described above.

In step SA10, the second image generation unit 503 may change the value of the filter size using a gradient descent method. As the gradient descent method, a stochastic gradient descent method, a steepest descent method, or the like is adopted. For example, the second image generation unit 503 calculates a difference between a maximum value of a concordance rate in the previous marker detection processing and a maximum value of a concordance rate in the marker detection processing before the last, and changes the value of the filter size according to the calculated difference. For example, the second image generation unit 503 changes the value of the filter size such that a degree of change in the value of the filter size decreases as the calculated difference increases. At the time of the change by the gradient descent method, the second image generation unit 503 may change the value of the filter size within the range of the upper limit value and the lower limit value of the filter size described above.

When the value of the filter size is changed, the second detection unit 506 performs the determination in step SA3 again. The processor 50 repeats steps SA3 to SA10 until all the positions of the markers MK to be detected are detected.

In this way, the server device 5 generates the binarized image P6 and detects the marker MK from the generated binarized image P6.

The third camera 4 of the present embodiment performs photographing in a low exposure state. The low exposure state refers to a state in which the exposure is low, and refers to a state in which the exposure is a predetermined value or less. Note that the predetermined value is determined by an advanced test or simulation based on the viewpoint that the first display area 33, the second display area 34, and the third display area 35 appropriately appear in the panel photographed image P3. Therefore, the non-luminescent marker MK appears dark in the panel photographed image P3. However, as illustrated in FIG. 8, the marker MK is highlighted in the binarized image P6. Therefore, the server device 5 can detect the marker MK from the photographed image of the third camera 4 even when the third camera 4 is in the low exposure state.

As described using FIG. 12, the server device 5 changes the filter size until all the markers MK to be detected are detected. The size of the marker MK appearing in the panel photographed image P3 varies depending on a relative position of the third camera 4 with respect to the control device 20 or an angle of view of the third camera 4. However, since the filter size is changed, an appropriate filter size can be set for each marker MK. Therefore, the server device 5 can detect the marker MK from the photographed image of the third camera 4 without depending on a relative position of the third camera 4 with respect to the control device 20 or an angle of view of the third camera 4.

Figure 13:
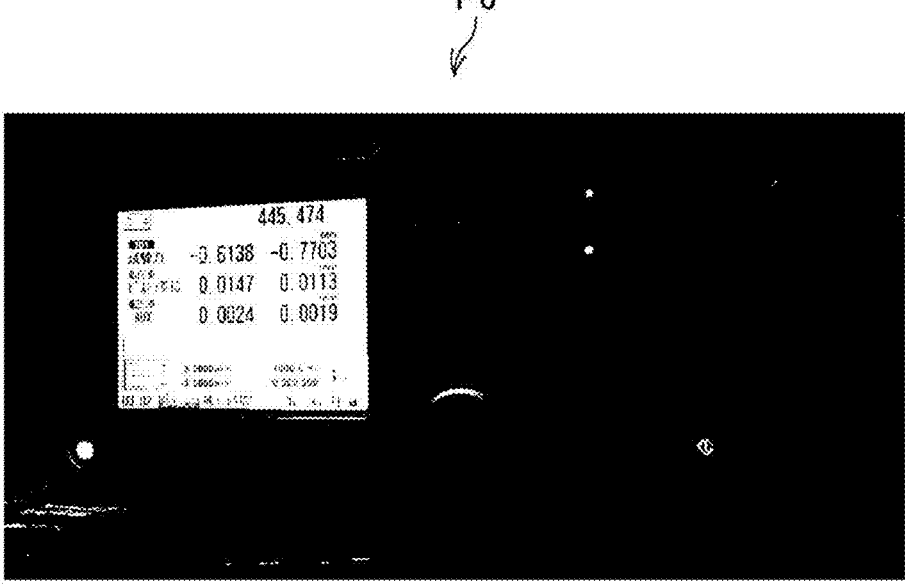
FIG. 13 is a diagram illustrating an example of a binarized image.

Note that the value of the filter size is preferably large, but is not preferably small. When the value of the filter size is larger, more elements other than the marker MK are included in the filter size at the time of performing the blur processing on the portion of the marker MK. Therefore, when the value of the filter size is larger, more elements other than the marker MK are included and leveled at the time of performing the blur processing on the portion of the marker MK, and there is a possibility that the marker MK cannot be appropriately leveled. In addition, when the blur processing is performed on the portion of the marker MK, the smaller the filter size, the more biased the proportion of black and white included in the filter size. Therefore, even if the filter size is too small, there is a possibility that the portion of the marker MK cannot be appropriately leveled. This leads to the marker MK not being highlighted in the binarized image P6. FIG. 13 illustrates an example of the binarized image P6 in a case where the marker MK does not appropriately appear because the filter size is too small. As described above, it is necessary to determine the filter size to an appropriate value, but since the server device 5 changes the value of the filter size, the value of the filter size can be set to an appropriate value.

Next, an operation of the server device 5 using the position of the marker MK stored by a flowchart of FIG. 14 will be described.

Figure 14:
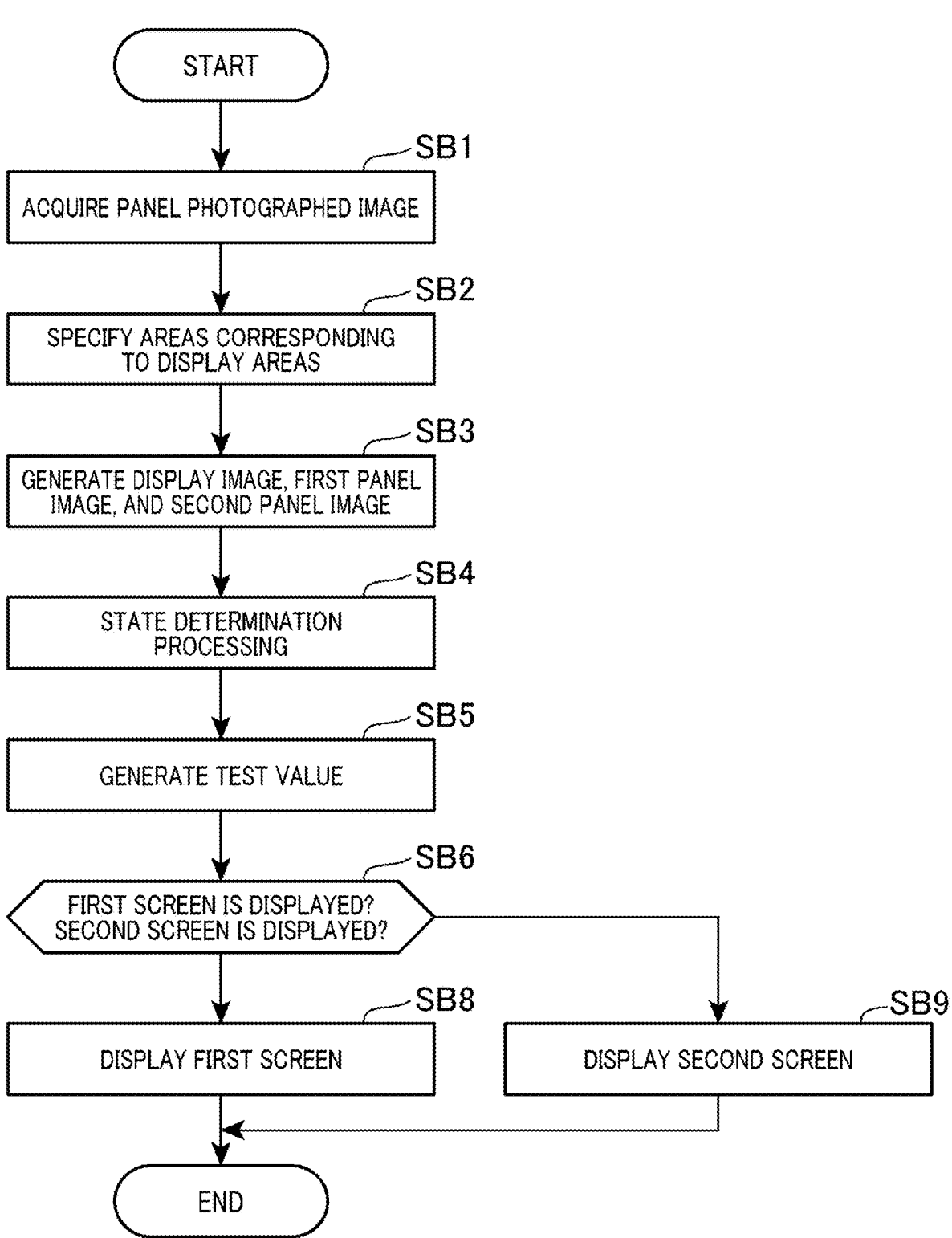
FIG. 14 is a flowchart illustrating an operation of the server device.

FIG. 14 is a flowchart illustrating the operation of the server device 5.

The acquisition unit 501 acquires the panel photographed image P3 (step SB1).

Next, the specification unit 507 specifies areas corresponding to the first display area 33, the second display area 34, and the third display area 35 in the panel photographed image P3 acquired in step SB1 (step SB2).

Next, the image processing unit 508 generates the display image P7, the first lamp image P8, and the second lamp image P9 from the areas specified in step SB2 (step SB3).

Next, the determination unit 510 performs state determination processing (step SB4). The state determination processing includes processing of determining the hydraulic source state and processing of determining the test state of the fatigue test.

Next, the test value generation unit 509 generates a test value (step SB5).

Next, the display control unit 511 determines whether the first screen 800 is displayed or the second screen 900 is displayed based on the operation from the user (step SB6).

When it is determined that the first screen 800 is displayed (step SB5: first screen), the display control unit 511 causes the display unit 56 to display the first screen 800 (step SB6).

Next, when it is determined that the second screen 900 is displayed (step SB5: second screen), the display control unit 511 causes the display unit 56 to display the second screen 900 (step SB7).

2. Second Embodiment

Next, a second embodiment will be described.

In configurations of respective units of a monitoring system 100 of the second embodiment, the same configurations as those of the first embodiment are denoted by the same reference numerals, and detailed description thereof will be omitted.

[2-1. Configuration of Server Device]

Figure 15:
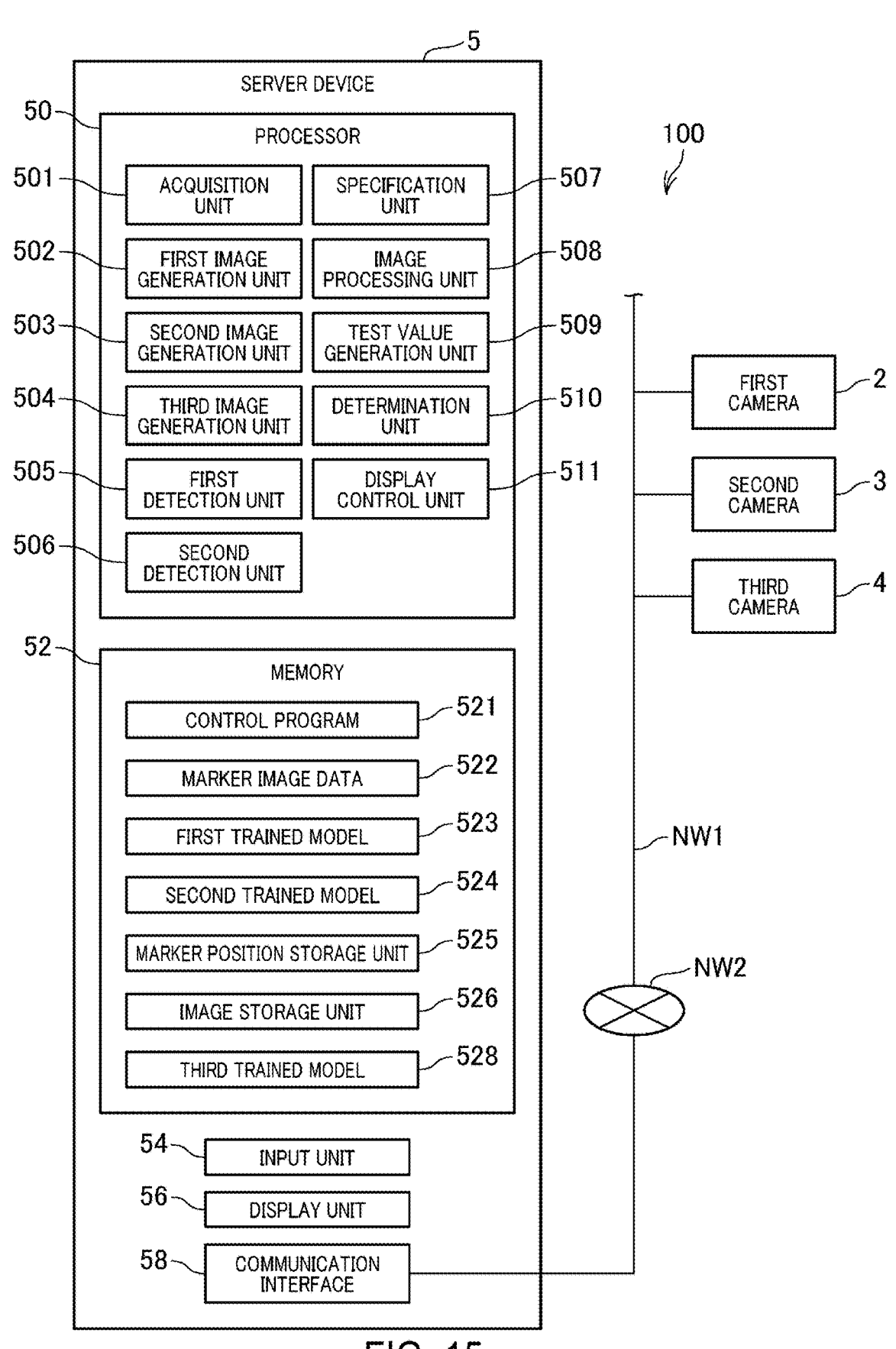
FIG. 15 is a diagram illustrating an example of a configuration of a server device.

FIG. 15 is a diagram illustrating an example of a configuration of a server device 5 according to the second embodiment.

As clear from comparison between FIG. 15 and FIG. 5, a memory 52 of the second embodiment stores a third trained model 528.

The third trained model 528 corresponds to an example of a "trained model".

The third trained model 528 is a trained model in which a relation among a value of a filter parameter, a position of a marker MK in a panel photographed image P3, and an existence probability that the marker MK exists at the position is trained by machine learning (so-called "supervised learning"). Note that the existence probability is represented in percentage, for example. When the value of the filter parameter is input, the third trained model 528 outputs a combination of the position of the marker MK in the panel photographed image P3 and the existence probability that the marker MK exists at the position. Note that the third trained model 528 outputs a plurality of combinations.

A second image generation unit 503 of the second embodiment changes the value of the filter parameter using the third trained model 528. Also in the second embodiment, a filter size is exemplified as the filter parameter. A change of a value of the filter size in the second embodiment will be described later.

[2-2. Operation of Server Device]

An operation of the server device 5 related to the storage of the position of the marker MK will be described with reference to FIG. 16. Note that the server device 5 of the second embodiment performs an operation similar to that of the first embodiment with respect to an operation related to a first screen 800 and a second screen 900 using the position of the marker MK.

Figure 16:
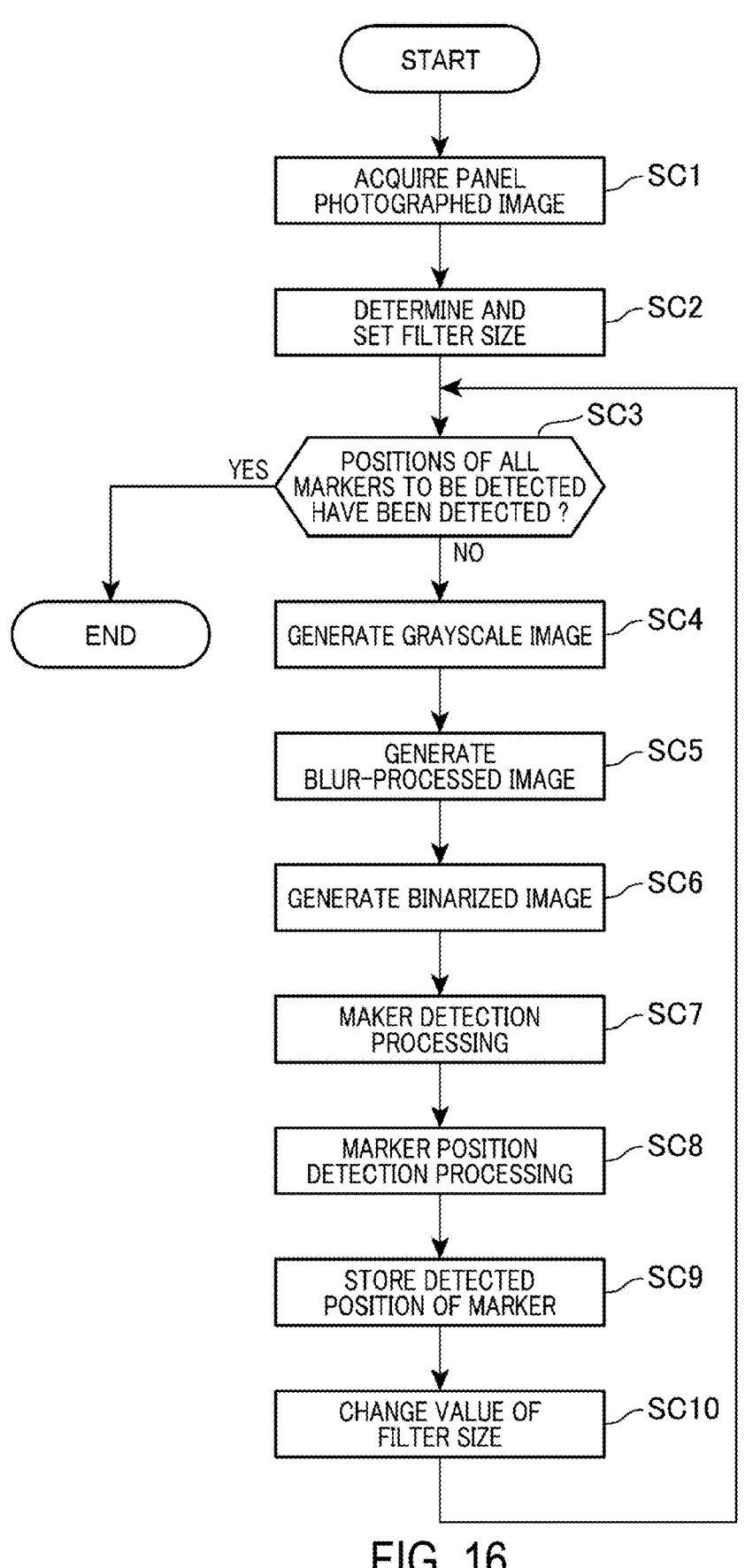
FIG. 16 is a flowchart illustrating an operation of the server device.

FIG. 16 is a flowchart illustrating the operation of the server device 5.

In a case where a predetermined start trigger is generated, the server device 5 performs the operation of FIG. 16. Here, examples of the predetermined start trigger include a case where an instruction to update the position of the marker MK in the panel photographed image P3 is received from a user, a case where an instruction to set the position of the marker MK in the panel photographed image P3 is received from the user, and the like.

An acquisition unit 501 acquires the panel photographed image P3 (step SC1).

Next, the second image generation unit 503 determines a value to be set to a filter size of blur processing, and sets the determined value (step SC2).

In step SC2, the second image generation unit 503 increases or decreases candidates for the value to be set to the filter size in one or more stages until at least one of the existence probabilities output from the third trained model 528 becomes a predetermined probability or more. Note that the second image generation unit 503 inputs the changed filter size to the third trained model 528 every time the filter size value candidate is changed. Note that the stage of changing the filter size is not limited to one stage, and may be a plurality of stages. In a case where at least one of the existence probabilities output from the third trained model 528 becomes the predetermined probability or more, the second image generation unit 503 determines, as the value to be set to the filter size, a candidate for the value of the filter size that has been most recently input to the third trained model 528. Similarly to the first embodiment, the second image generation unit 503 may change the value of the filter size within a range of a lower limit value and an upper limit value determined from the size of the marker MK.

In step SC2, the second image generation unit 503 may determine a candidate for the value of the filter size by a gradient descent method using the existence probability output from the third trained model 528. The second image generation unit 503 inputs the filter size value candidate to the third trained model 528, and acquires the existence probability from the third trained model 528. When the output existence probability is the predetermined probability or less, the second image generation unit 503 changes the filter size value candidate, inputs the changed filter size value candidate to the third trained model 528, and acquires the existence probability from the third trained model 528 again. Next, in a case where the existence probability acquired this time is the predetermined probability or less, the second image generation unit 503 calculates a difference between the existence probability acquired this time and the existence probability acquired last time, and changes a candidate for the value of the filter size according to the calculated difference. For example, the second image generation unit 503 changes the filter size value candidate such that a degree of change in the filter size value candidate decreases as the calculated difference increases. The second image generation unit 503 continues to change the filter size value candidate until the existence probability output from the third trained model 528 becomes the predetermined probability or more. In a case where at least one of the existence probabilities output from the third trained model 528 becomes the predetermined probability or more, the second image generation unit 503 determines, as the value to be set to the filter size, a candidate for the value of the filter size input to the third trained model 528 most recently. Similarly to the first embodiment, the second image generation unit 503 may change the value of the filter size within a range of a lower limit value and an upper limit value determined from the size of the marker MK.

Next, a second detection unit 506 determines whether or not positions of all markers MK to be detected have been detected (step SC3). The determination in step SC3 is performed by a method similar to that in step SA3.

When the second detection unit 506 determines that the positions of all the markers MK to be detected have not been detected (step SC3: NO), a first image generation unit 502 generates a grayscale image P4 obtained by gray-scaling the panel photographed image P3 acquired in step SC1 (step SC4).

Next, the second image generation unit 503 generates a blur-processed image P5 obtained by performing blur processing on the grayscale image P4 generated in step SC3 (step SC5). Note that, in a case where the processing in step SC5 is the first processing after starting the flowchart in FIG.

16, the blur processing in which the value determined in step SC2 has been set to the filter size is applied to the panel photographed image P3. In addition, in a case where the processing of step SC5 is the second and subsequent processing after starting the flowchart of FIG. 16, the blur processing in which the value changed in step SC10 has been set to the filter size is applied to the panel photographed image P3.

Next, a third image generation unit 504 generates a binarized image P6 using the grayscale image P4 generated in step SC4 and the blur-processed image P5 generated in step SA5 (step SC6).

Next, a first detection unit 505 performs marker detection processing (step SC7). The marker detection processing in step SC7 is processing of detecting the marker MK from the binarized image P6 generated in step SC6. Note that, in a case where the processing of step SC6 is the first processing after starting the flowchart of FIG. 16, the first detection unit 505 performs pattern matching on the position of the binarized image P6 in which the existence probability is the predetermined probability or more in the processing of step SC2. Further, in a case where the processing of step SC6 is the second and subsequent processing after starting the flowchart of FIG. 16, the first detection unit 505 performs pattern matching on the position of the binarized image P6 in which the existence probability is the predetermined probability or more in the processing of step SC10.

Next, the second detection unit 506 performs marker position detection processing (step SC8). The marker position detection processing in step SC8 is processing of detecting the position of the marker MK detected in the marker detection processing in step SC7 in the panel photographed image P3. In a case where the marker MK is not detected in the marker detection processing, a processor 50 skips the processing of step SC8.

Next, the second detection unit 506 stores the position of the marker MK detected in the marker position detection processing in a marker position storage unit 525 (step SC9).

Next, the second image generation unit 503 changes the value of the filter size (step SC10). The change in step SC10 is performed similarly to the determination of the value in step SC2.

When the value of the filter size is changed, the second detection unit 506 performs the determination of step SC3 again. The processor 50 repeats steps SC3 to SC10 until all the positions of the markers MK to be detected are detected.

According to the second embodiment, effects similar to those of the first embodiment can be obtained.

3. Aspects

It is understood by those skilled in the art that each embodiment described above is a specific example of the following aspects.

Item 1

A monitoring device according to one aspect is a monitoring device of a material testing machine including a display having a marker on a display panel. The monitoring device includes: an acquisition unit that acquires a photographed image of a camera that photographs the display panel; a first generation unit that generates a first processed image obtained by gray-scaling the photographed image; a second generation unit that generates a second processed image obtained by performing blur processing on the first processed image; a third generation unit that generates a third processed image obtained by binarizing the first processed image based on the second processed image; and a first detection unit that detects the marker from the third processed image.

According to the monitoring device according to Item 1, the marker can be highlighted in an image used for detection by the first detection unit. Therefore, even when an exposure of the camera is low, the marker of the display panel of the display can be detected from the photographed image of the camera.

Item 2

The monitoring device according to Item 1, further including: a second detection unit that detects a position of the marker detected by the first detection unit in the photographed image, wherein the second generation unit changes a value of a filter parameter of the blur processing, and when the second detection unit does not detect all positions of the marker to be detected, the second generation unit generates the second processed image subjected to the blur processing by the filter parameter whose value has been changed, the third generation unit generates the third processed image again based on the second processed image subjected to the blur processing by the filter parameter whose value has been changed and the first processed image, and the first detection unit detects the marker from the third processed image generated again by the third generation unit.

According to the monitoring device according to Item 2, when all positions of the marker to be detected are not detected, the marker is detected again by changing the value of the filter parameter. Therefore, even when the exposure of the camera is low, all markers included in the display panel of the display can be detected from the photographed image of the camera.

Item 3

The monitoring device according to Item 2, further including: a trained model in which a relation among a value of the filter parameter, a position of the marker in the photographed image, and an existence probability that the marker exists at the position is trained by machine learning, wherein the second generation unit changes the value of the filter parameter based on the existence probability output from the trained model by the input of the filter parameter.

According to the monitoring device according to Item 3, since the value of the filter parameter is changed using the existence probability output from the trained model, the value of the filter parameter can be appropriately changed to the value of the filter parameter having a high possibility of detecting the marker. Therefore, even when the exposure of the camera is low, the marker of the display panel of the display can be accurately detected from the photographed image of the camera.

Item 4

The monitoring device according to item 3, wherein the second generation unit changes the value of the filter parameter by a gradient descent method using the existence probability.

According to the monitoring device according to Item 4, the value of the filter parameter can be changed to an appropriate value without changing the value of the filter parameter in stages. Therefore, since the value of the filter parameter can be efficiently changed, the marker can be quickly detected.

Item 5

The monitoring device according to any one of Items 1 to 4, further including: a second detection unit that detects a position of the marker detected by the first detection unit in the photographed image; and a specification unit that specifies an area corresponding to a predetermined area of the display panel from the photographed image, based on the position of the marker detected by the second detection unit.

According to the monitoring device according to Item 5, even when the exposure of the camera is low, the predetermined area of the display panel can be specified from the photographed image of the camera using the marker.

Item 6

A monitoring system according to another aspect is a monitoring system including a monitoring device of a material testing machine including a display having a marker on a display panel, and a camera that photographs the display panel. The monitoring device includes: an acquisition unit that acquires a photographed image of the camera that photographs the display panel; a first generation unit that generates a first processed image obtained by gray-scaling the photographed image; a second generation unit that generates a second processed image obtained by performing blur processing on the first processed image; a third generation unit that generates a third processed image obtained by binarizing the first processed image based on the second processed image; and a first detection unit that detects the marker from the third processed image.

According to the monitoring system according to Item 6, effects similar to those of the monitoring device according to Item 1 are obtained.

4. Other Embodiments

Note that the fatigue testing machine 1 according to each embodiment is merely an example of an aspect of the material testing machine according to the present invention, and can be arbitrarily modified and applied without departing from the gist of the present invention.

For example, in each of the above-described embodiments, a case where the material testing machine is the fatigue testing machine 1 will be described, but the present invention is not limited thereto. The material testing machine may be, for example, a tensile testing machine, a compression testing machine, a bending testing machine, a torsion testing machine, or the like.

For example, in each of the above-described embodiments, the filter size is exemplified as the filter parameter. However, when the blur processing is a Gaussian filter, the filter parameter may be a standard deviation or an average value.

For example, in each of the above-described embodiments, the Gaussian filter is exemplified as the blur processing, but the blur processing is not limited to the Gaussian filter, and may be another filter such as an averaging filter. For example, when the blur processing is the averaging filter, the filter parameter may be a filter size.

For example, in each of the above-described embodiments, the display is not limited to the control device 20. The display may be separate from the control device 20 as long as the display has the same configuration as the configuration of the display panel 21.

Further, for example, the color of the marker MK is not limited to the color of the above-described embodiment. The marker MK may be a non-luminescent marker MK.

In addition, each functional unit illustrated in FIGS. 5 and 15 shows a functional configuration, and a specific mounting form is not particularly limited. That is, hardware individually corresponding to each functional unit does not necessarily need to be mounted, and it is possible to have a configuration in which functions of a plurality of functional units are realized by one processor executing a program. In addition, some of the functions implemented by software in the above embodiments may be implemented by hardware, or some of the functions implemented by hardware may be implemented by software.

In addition, the processing units of the flowcharts illustrated in FIGS. 12, 14, and 16 are divided according to main processing contents in order to facilitate understanding of processing by the server device 5. The division method and the name of the processing unit illustrated in these flowcharts are not restrictive, and according to the processing content, the processing unit can be divided into more processing units, or can be divided such that one processing unit includes more processing. Also, the processing order of the above flowchart is not limited to the illustrated example.

The control program 521 to be executed by the processor 50 can also be recorded in a computer-readable recording medium.

As the recording medium, a magnetic or optical recording medium or a semiconductor memory device can be used. Specifically, examples of the recording medium include a portable or fixed recording medium such as a flexible disk, an HDD, a compact disk read only memory (CD-ROM), a DVD, a Blu-ray (registered trademark) Disc, a magneto-optical disk, a flash memory, or a card-type recording medium.

The recording medium may be a non-volatile storage device such as a RAM, a ROM, or an HDD which is an internal storage device included in the server device 5. In addition, the control program 521 may be stored in another server device or the like different from the server device 5, and the server device 5 may download the control program 521 from another server device.

REFERENCE SIGNS LIST

1 fatigue testing machine (material testing machine)
4 third camera (camera)
5 server device (monitoring device)
20 control device (display)
33 first display area (predetermined area)
34 second display area (predetermined area)
35 third display area (predetermined area)
100 monitoring system
501 acquisition unit
502 first image generation unit (first generation unit)
503 second image generation unit (second generation unit)
504 third image generation unit (third generation unit)
505 first detection unit
506 second detection unit
507 specification unit
521 control program

24

528 third trained model (trained model)
MK marker
P3 panel photographed image (photographed image of camera)
P4 grayscale image (first processed image)
P5 blur-processed image (second processed image)
P6 binarized image (third processed image)

What is claimed is:

1. A monitoring device of a material testing machine including a display panel having a display area including a first display that displays a test value and/or a test state, and a non-luminescent marker on the display panel, wherein
the non-luminescent marker is attached to the display panel in correspondence with the display area,
the monitoring device comprises a processor that is configured to:
acquire a photographed image of a camera that photographs the display panel;
generate a first processed image obtained by grayscaling the photographed image;
generate a second processed image obtained by performing blur processing on the photographed image;
generate a third processed image obtained by binarizing the first processed image based on the second processed image;
detect the non-luminescent marker from the third processed image;
generate an extracted image by extracting the display area, from the photographed image, corresponding with the non-luminescent marker based on the non-luminescent marker detected; and
display a determination result of the test value and/or the test state on a second display of the monitoring device based on the extracted image generated.

2. The monitoring device according to claim 1, wherein the processor is further configured to:
detect a position of the non-luminescent marker detected by the first detection unit in the photographed image,
change a value of a filter parameter of the blur processing, and when do not detect all positions of the non-luminescent marker to be detected, detect the second processed image subjected to the blur processing by the filter parameter whose value has been changed,
generate the third processed image again based on the second processed image subjected to the blur processing by the filter parameter whose value has been changed and the first processed image, and
detect the non-luminescent marker from the third processed image generated again.

3. The monitoring device according to claim 2, further comprising:
a trained model in which a relation among a value of the filter parameter, a position of the non-luminescent marker in the photographed image, and an existence probability that the non-luminescent marker exists at the position is trained by machine learning, wherein
the processor changes the value of the filter parameter based on the existence probability output from the trained model by the input of the filter parameter.

4. The monitoring device according to claim 3, wherein the processor changes the value of the filter parameter by a gradient descent method using the existence probability.

5. The monitoring device according to claim 1, wherein the processor is further configured to:

detect a position of the non-luminescent marker detected by the first detection unit in the photographed image, and specify a predetermined area of the display panel based on the position of the non-luminescent marker detected.

6. A monitoring system including a monitoring device of a material testing machine including a display area including a first display that displays a test value and/or a test state, and a display panel having a non-luminescent marker on the display panel, and a camera photographing the display panel, wherein the non-luminescent marker is attached to the display panel in correspondence with the display area, the monitoring device includes a processor that is configure to:

acquire a photographed image of the camera that photographs the display panel;

generate a first processed image obtained by gray-scaling the photographed image;

generate a second processed image obtained by performing blur processing on the photographed image;

generate a third processed image obtained by binarizing the first processed image based on the second processed image;

a detect the non-luminescent marker from the third processed image;

generate an extracted image by extracting the display area, from the photographed image, corresponding with the non-luminescent marker based on the non-luminescent marker detected; and display a determination result of the test value and/or the test state on a second display of the monitoring device based on the extracted image generated.

\*   \*   \*   \*   \*